(12) United States Patent
Guilford et al.

(10) Patent No.: US 12,305,377 B2
(45) Date of Patent: May 20, 2025

(54) SYSTEM AND METHOD FOR DISINFECTION OF A PLUMBING SYSTEM ASSOCIATED WITH LIQUID WASTE

(71) Applicant: University of Virginia Patent Foundation, Charlottesville, VA (US)

(72) Inventors: William H. Guilford, Charlottesville, VA (US); Amy J. Mathers, Charlottesville, VA (US); Shireen M. Kotay, Charlottesville, VA (US)

(73) Assignee: University of Virginia Patent Foundation, Charlottesville, VA (US)

( * ) Notice: Subject to any disclaimer, the term of this patent is extended or adjusted under 35 U.S.C. 154(b) by 581 days.

(21) Appl. No.: 16/969,637

(22) PCT Filed: Feb. 26, 2019

(86) PCT No.: PCT/US2019/019556
§ 371 (c)(1),
(2) Date: Aug. 13, 2020

(87) PCT Pub. No.: WO2019/168836
PCT Pub. Date: Sep. 6, 2019

(65) Prior Publication Data
US 2020/0399874 A1    Dec. 24, 2020

Related U.S. Application Data

(60) Provisional application No. 62/635,652, filed on Feb. 27, 2018, provisional application No. 62/810,061, filed on Feb. 25, 2019.

(51) Int. Cl.
*E03C 1/126* (2006.01)
*C02F 1/02* (2023.01)
(Continued)

(52) U.S. Cl.
CPC ........... *E03C 1/126* (2013.01); *C02F 1/02* (2013.01); *F16L 53/38* (2018.01); *F16L 59/024* (2013.01);
(Continued)

(58) Field of Classification Search
None
See application file for complete search history.

(56) References Cited

U.S. PATENT DOCUMENTS 2,452,367 A    10/1948  Gangloff
2,736,038 A     2/1956  Mansfield
(Continued)

FOREIGN PATENT DOCUMENTS

CN    1585726 A    2/2005
DE    4206901 A1   9/1993
(Continued)

OTHER PUBLICATIONS

Leitner, E. et al., "Contaminated handwashing sinks as the source of a clonal outbreak of KPC-2-producing Klebsiella oxytoca on a hematology ward", Antimicrob Agents Chemother. vol. 59, No. 1, Jan. 2015, pp. 714-716.
(Continued)

*Primary Examiner* — Richard C Gurtowski
(74) *Attorney, Agent, or Firm* — Robert J. Decker

(57) ABSTRACT

A thermal disinfection system, and related of method of use and manufacture, is implemented with a liquid-carrying conduit associated with a given plumbing system applicable with a given environment. The thermal disinfection system may include a heating device configured for thermal contact with at least a portion of the liquid-carrying conduit, thereby defining a thermal contact region of the liquid-carrying conduit. Additionally, a thermal insulating layer may disposed on the heating device. The heating device may be
(Continued)

configured to heat (or heat and dry) a lumen defined by the liquid-carrying conduit along the thermal contact region (in whole or in part) to a specified temperature to prevent (e.g., suppress) or inhibit (e.g., reduce) microbial activity from advancing through the lumen defined by the liquid-carrying conduit.

116 Claims, 14 Drawing Sheets

(51) Int. Cl.
 F16L 53/38 (2018.01)
 F16L 59/02 (2006.01)
 C02F 103/00 (2006.01)
(52) U.S. Cl.
 CPC .... C02F 2103/003 (2013.01); C02F 2209/02 (2013.01); C02F 2303/04 (2013.01)

(56) References Cited

U.S. PATENT DOCUMENTS

| | | | |
|---|---|---|---|
| 3,985,994 A | 10/1976 | Eloranta et al. | |
| 4,192,988 A * | 3/1980 | Pederson, Jr. | C02F 1/02 219/535 |
| 4,502,164 A | 3/1985 | Gemmell | |
| 5,039,135 A | 8/1991 | Palmer | |
| 5,079,784 A | 1/1992 | Rist et al. | |
| 5,271,086 A * | 12/1993 | Kamiyama | F24H 1/142 137/341 |
| 5,940,894 A | 8/1999 | Cruz | |
| 6,666,966 B1 | 12/2003 | Schluttig | |
| 2002/0074243 A1* | 6/2002 | Nakamura | C02F 1/46104 205/742 |
| 2005/0077732 A1* | 4/2005 | Baarman | F03B 13/00 290/54 |
| 2007/0280649 A1 | 12/2007 | Korstanje | |
| 2009/0238547 A1* | 9/2009 | Borgmeier | H05B 3/56 392/465 |
| 2011/0162824 A1 | 7/2011 | Farrell | |
| 2017/0030503 A1* | 2/2017 | Faulkner | F16L 53/38 |
| 2019/0141911 A1* | 5/2019 | Nguyen | F21V 29/50 165/64 |

FOREIGN PATENT DOCUMENTS

| | | | |
|---|---|---|---|
| EP | 0338056 B1 | 1/1994 | |
| GB | 1417711 A | 12/1975 | |
| JP | 2001340844 A | 12/2001 | |
| JP | 2002309643 A | 10/2002 | |
| JP | 2008007978 A | 1/2008 | |
| KR | 20110092376 A | 8/2011 | |
| WO | 2002081829 A1 | 10/2002 | |

OTHER PUBLICATIONS

Kotsanas, D. et al., "Down the drain: carbapenem-resistant bacteria in intensive care unit patients and handwashing sinks", Med. J. Aust, vol. 198, No. 5, Mar. 18, 2013, pp. 267-269.
Tofteland, S. et al., "A Long-Term Low-Frequency Hospital Outbreak of KPC-Producing Klebsiella pneumoniae Involving Intergenus Plasmid Diffusion and a Persisting Environmental Reservoir", PLOS ONE vol. 8, No. 3, Mar. 2013, pp. 1-8.
Lowe, C. et al., "Outbreak of Extended-Spectrum β-Lactamase-producing Klebsiella oxytoca Infections Associated with Contaminated Handwashing Sinks", Emerging Infectious Diseases, vol. 18, No. 8, Aug. 2012, pp. 1242-1247.
Frieden, T., "Antibiotic resistance threats in the United States, 2013", Centers for Disease Control and Prevention, US Department of Health and Human Services, Apr. 23, 2013, pp. 5-113 (total 114 pages).
World Health Organization, "Practical guidelines for infection control in health care facilities", Searo Regional Publication No. 41, 2004, pp. i-vii and 1-103 (total 110 pages).
Moritz, A. et al., "Studies of Thermal Injury", The American journal of pathology, vol. 23, 1947, pp. 695-720.
Spellberg, B. et al., "Trends in antimicrobial drug development: implications for the future", Clinical Infectious Diseases, vol. 38, May 1, 2004, pp. 1279-1286.
Moland et al., "Plasmid-mediated, carbapenem-hydrolysing β-lactamase, KPC-2, in Klebsiella pneumoniae isolates", Journal of Antimicrobial Chemotherapy, vol. 51, Jan. 28, 2003, pp. 711-714.
Buntin, J., "Outbreak at NIH", Washingtonian, Jun. 4, 2013. Available at: http://www.washingtonian.com/articles/people/outbreak-at-nih/. (Accessed: Oct. 15, 2015), pp. 1-23.
Melville N., "Contaminated Sink Drains Linked to ICU Infection Outbreaks", Medscape, Dec. 4, 2014. Available at: http://www.medscape.com/viewarticle/835925. (Accessed: Oct. 15, 2015), 2 pages.
Halpern, N. et al., "Critical care medicine in the United States 2000-2005: an analysis of bed numbers, occupancy rates, payer mix, and costs", Critical Care Medicine vol. 38, No. 1, 2010, pp. 65-71.
Center for Disease Control and Prevention, "Tracking CRE in the United States", Available at: http://www.cdc.gov/hai/organisms/cre/TrackingCRE.html, Jan. 2, 2020, 1 page.
Schluttig, "Prevention of Infectious Aerosols in Hospitals by BIOREC", Infectious aerosols from sink drains, BIOREC, Dr. Schluttig, Available at: http://biorec.de/en/?The_Selfdisinfecting_Syphon_BIOREC, Downloaded from the Internet on May 22, 2017, 2 pages.
Schluttig, "The Technical Solution of the Problem by Biorec", Available at: http://biorec.de/en/?The_Selfdisinfecting_Syphon_BIOREC:The_Technical_Background, Downloaded from the Internet on May 22, 2017, 2 pages.
Mathers, A. et al., "Intensive Care Unit Wastewater Interventions to Prevent Transmission of Multispecies Klebsiella pneumoniae Carbapenemase Producing Organisms", Clinical Infectious Diseases, vol. 67, Jul. 15, 2018 (Published online Feb. 2, 2018), pp. 171-178.
Perryman, F. et al., "Prevalence of Gentamicin-and Amikacin-Resistant Bacteria in Sink Drains", Journal of Clinical Microbiology, Jul. 1980, vol. 12, No. 1, p. 79-83.
Weingarten, R. et al., "Genomic Analysis of Hospital Plumbing Reveals Diverse Reservoir of Bacterial Plasmids Conferring Carbapenem Resistance", (Table 1, "Summary of environmental locations surveyed and blaKPC/blaNDM-positive organisms identified between Jan. 2012 and Dec. 2016"), mBio, vol. 9, Issue 1, Jan./Feb. 2018, Available at: https://www.ncbi.nim.nih.gov/PMC5801463/table/tab 1/, pp. 1-9.
Lalancette, C. et al., "Hospital Drains as Reservoirs of Pseudomonas aeruginosa: Multiple-Locus Variable-Number of Tandem Repeats Analysis Genotypes Recovered from Faucets, Sink Surfaces and Patients", Pathogens, vol. 6, No. 36, Aug. 9, 2017, pp. 1-12.
Kotay, S. et al., "Spread from the Sink to the Patient: in situ Study Using Green Fluorescent Protein (GFP) Expressing-*Escherichia coli* to Model Bacterial Dispersion from Hand Washing Sink Trap Reservoirs", AEM accepted Manuscript, vol. 83, issue 8, Feb. 24, 2017, pp. 1-12.
WIPO, International Search Report and Written Opinion of the International Searching Authority, International patent application No. PCT/US2019/019556, mailed May 1, 2019, 11 pages.

* cited by examiner

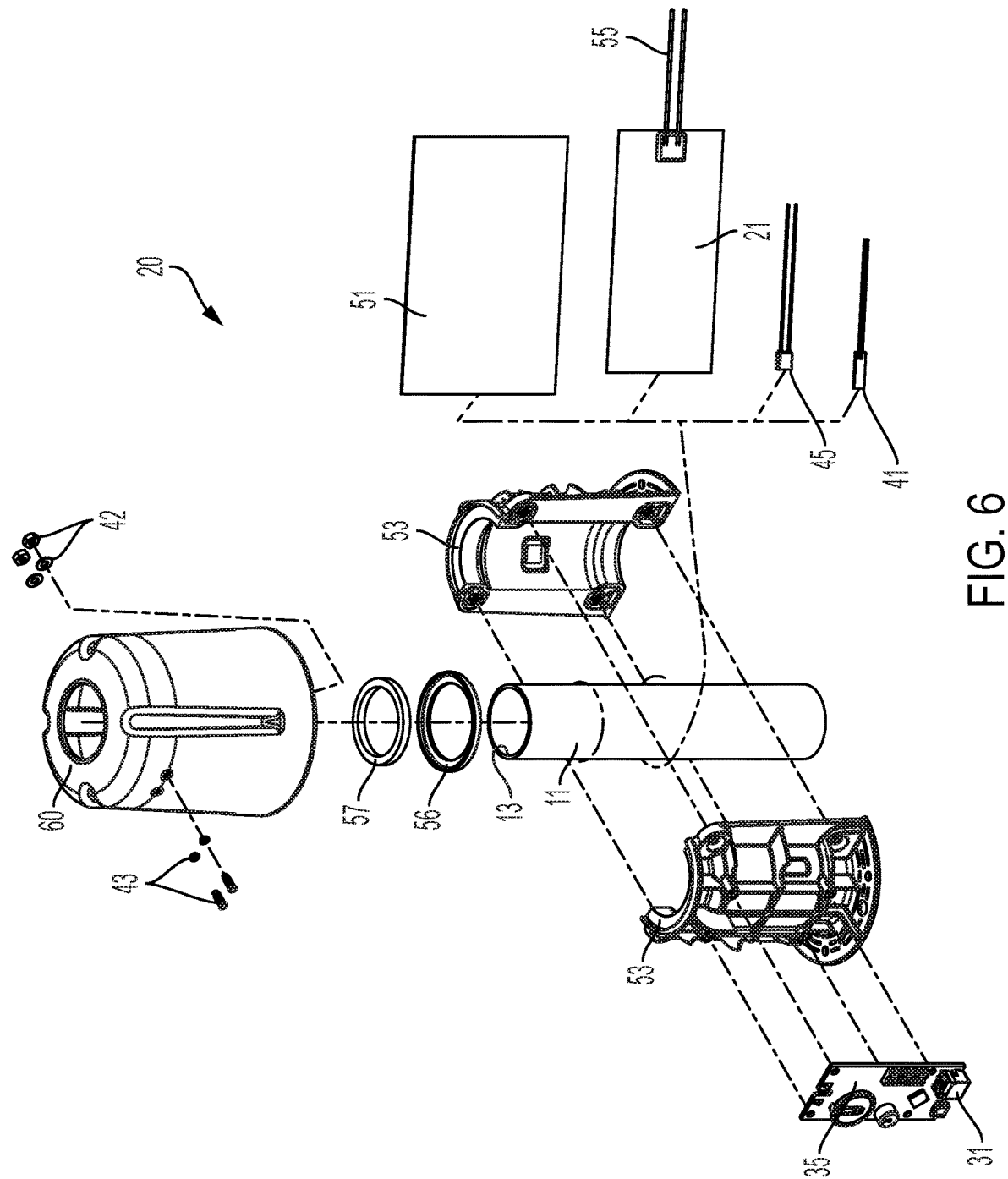

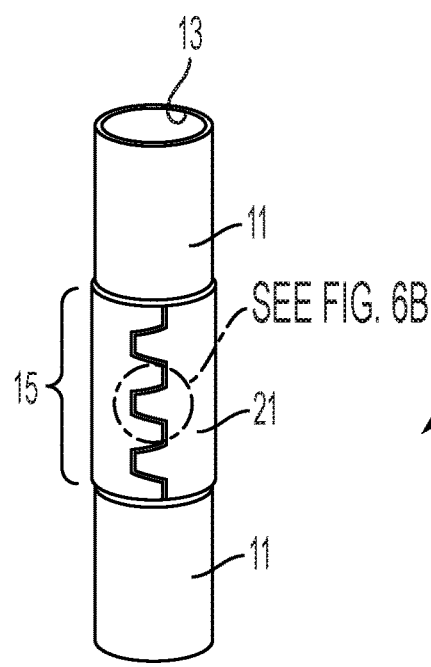
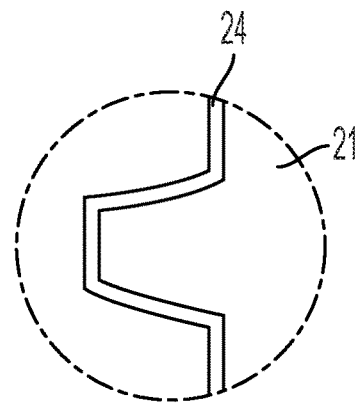
FIG. 7A  FIG. 7B
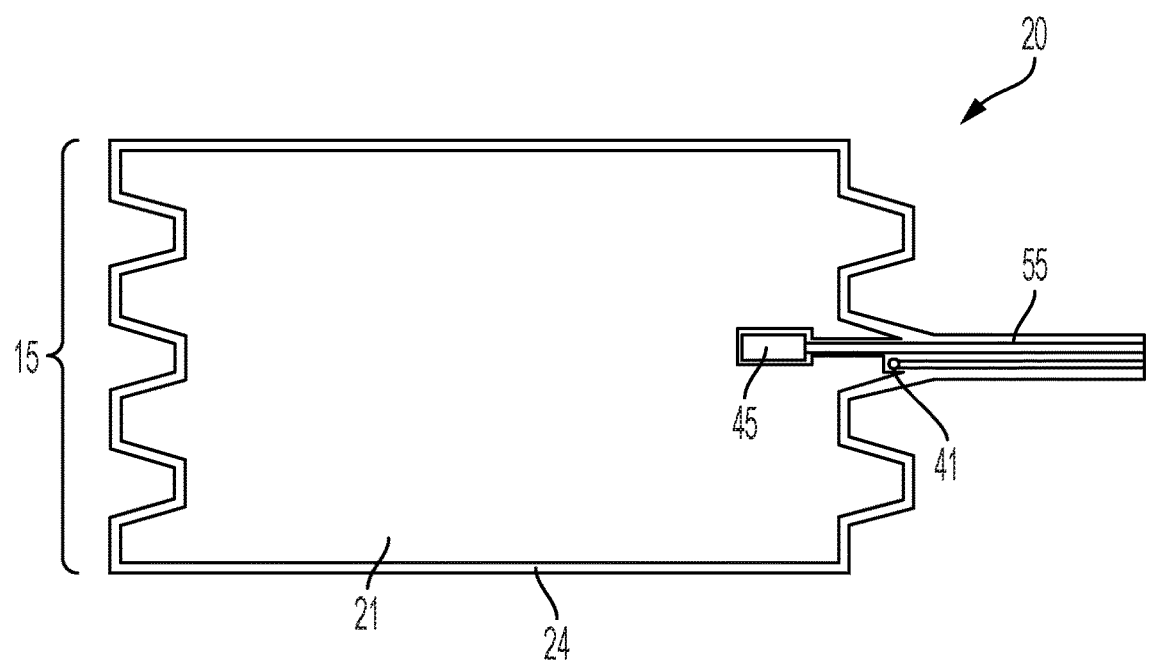
FIG. 7C

SYSTEM AND METHOD FOR DISINFECTION OF A PLUMBING SYSTEM ASSOCIATED WITH LIQUID WASTE

RELATED APPLICATIONS

The present application is a national stage filing of International Application No. PCT/US2019/019556, filed Feb. 26, 2019, which claims benefit of priority under 35 U.S.C § 119 (e) from U.S. Provisional Application Ser. No. 62/635,652, filed Feb. 27, 2018, entitled "System and Method to Prevent the Spread of Bacteria from Wastewater to Persons in Clinical Settings" and U.S. Provisional Application Ser. No. 62/810,061, filed Feb. 25, 2019, entitled "System and Method for Disinfection of a Plumbing System Associated with Liquid Waste"; the disclosures of which are hereby incorporated by reference herein in their entirety.

FIELD OF INVENTION

The present disclosure relates generally to a thermal disinfection system and method to prevent (e.g., suppress) or inhibit (e.g., reduce) the spread of bacteria from liquid waste in a plumbing system. More particularly, the present disclosure relates to a thermal device that can heat and/or dry conduits to prevent (e.g., suppress) or inhibit (e.g., reduce) bacterial growth and colonization.

BACKGROUND

In recent years, numerous hospitals have linked patient infections to carbapenem-resistant *Enterobacteriaceae* (CRE) and other resistant bacterial species in their wastewater systems and handwashing sinks. [See 1-4] The Centers for Disease Control and Prevention (CDC) has classified CRE infections as an urgent threat to public health, their highest designation. [See 5] Wastewater plumbing provides a reservoir for these bacteria that makes them incredibly difficult to eliminate through traditional disinfection methods. Data suggests that patients become infected when bacteria grow or migrate up the proximal wastewater plumbing and into the sink basin, and are subsequently disbursed onto surrounding surfaces.

Patients with infections caused by carbapenem-resistant *Enterobacteriaceae* (CRE) often have few safe and effective treatment options because carbapenem antibiotics are generally considered to be the last resort when battling bacterial infections that are nonresponsive to other classes of antibiotics. While antibiotic-resistant bacterial strains are becoming more common, new antibiotic drug development has lagged; only five new classes of antibiotics have been invented since 1970. In the past twenty years, FDA approval of new antibiotics has decreased by 56 percent. [See 8] From a commercial standpoint, the development of new antibiotic drugs is quickly becoming an investment not worth pursuing. Furthermore, investigations have shown that the *Klebsiella pneumoniae* carbapenemase-2 (KPC-2) gene for carbapenem resistance can be widely distributed to other bacterial species by sharing small pieces of DNA called plasmids. [See 9] The present inventor submits that a non-pharmaceutical approach to this issue is likely the most prudent and economically viable solution.

Hospitals that have linked CRE infections to their wastewater systems and have had great difficulty in eliminating these antibiotic-resistant bacteria from their sinks, plumbing, and wastewater systems; some aggressive strategies have worked temporarily, however a long-term solution has yet to be established. The National Institutes of Health (NIH), in an effort to prevent further spread of antibiotic-resistant bacteria in their hospital, attempted several different strategies ranging from hydrogen-peroxide vapor decontamination of their plumbing to complete replacement of the plumbing system, none of which prevented later reemergence of the pathogens. [See 10] A hospital in Sweden performed weekly treatment of contaminated sinks with acetic acid followed by boiling water in conjunction with two daily flushes, which was found to be a largely effective temporary solution. [See 11] While this strategy consistently resulted in reduction of positive sink drain samples for antibiotic-resistant bacteria, it is far from ideal over long time periods. At a hospital in Toronto, a regiment of sink cleaning three times daily in combination with sink drain modifications and an antimicrobial stewardship program prevented any further patient infections. [See 4] Again however, these are not practical long-term solutions to the problem.

Based on data from 2014, there are 5,627 hospitals in the United States, with 902,202 staffed beds. The need for diligent hand hygiene practice by healthcare workers requires hospitals to have an extremely large number of sinks. While building codes vary from state to state, sinks can be required in patient rooms, nurses' stations, procedure rooms, food preparation areas, laboratories, and most places where staff members may have physical contact with a patient. The high volume of sinks greatly increases the risk of pathogen spread to patients either directly from sinks in patient rooms or via a healthcare worker who has interacted with a different sink. The World Health Organization (WHO) suggests a minimum of one sink to every ten beds in hospital wards, but that ratio can be much higher, depending on the particular hospital and ward. For example, each individual room in an intensive care unit (ICU) ward could have its own sink. In 2005, there were 93,955 critical care beds in the United States, but that number had grown from 88,252 in 2000, an increase of 6.5 percent. [See 18] Thus, the present inventor estimates that there are easily over 500,000 hospital patient care sinks in the United States, excluding non-patient sinks (e.g., nursing stations, medical-prep, staff bathrooms and other hand wash sinks).

Patients carrying CRE have been reported in every state, excluding Idaho and Maine, as of February 2016. [See 19] According to the CDC, there are more than 9,000 healthcare associated infections are caused by CRE each year, resulting in over 600 deaths. [See 5] The hospitals or health care institutions who already consider preventing sink-related CRE infections a high priority would be principal consumers of an aspect of an embodiment of the present invention device, system and method. An aspect of an embodiment of the present invention device, system and method may also be implemented for other consumers or applications.

It is with respect to these and other considerations that an aspect of an embodiment of the present invention device, system, and method could also be marketed as a preventative measure to hospitals that have not yet encountered cases of CRE infections.

It is with respect to these and other considerations that an aspect of an embodiment of the present invention provides, among other things, a novel system and related method that prevents (e.g., suppresses) or inhibits (e.g., reduces) harmful bacteria from moving from a sink's wastewater plumbing to its basin, where it is more likely to reach a patient or others.

There is a long felt need in the art for an efficacious, reliable, cost-effective, and structurally adaptive thermal disinfection system and method for plumbing systems.

SUMMARY OF EXEMPLARY EMBODIMENTS OF THE INVENTION

An aspect of an embodiment of the present invention provides, among other things, an electronic device and related method to prevent (e.g., suppress) or inhibit (e.g., reduce) the spread of drug resistant bacteria in clinical settings and other potentially infectious settings.

An aspect of an embodiment of the present invention provides, among other things, a novel system and related method that prevents (e.g., suppresses) or inhibits (e.g., reduces) harmful bacteria from moving from a sink's wastewater plumbing to its basin, where it is more likely to reach a patient or others.

An aspect of an embodiment of the present invention device, system, and method prevents (e.g., suppresses) or inhibits (e.g., reduces) bacteria from growing or migrating up the proximal wastewater plumbing and into the sink basin or the like, which then otherwise would subsequently be disbursed onto surrounding surfaces.

The spread of antibiotic resistant bacteria in clinical settings is increasingly a problem. Wastewater plumbing provides a reservoir for these bacteria, and heretofore the use of traditional disinfection methods have been unsuccessful. Data suggests that patients become infected when bacteria grow or migrate up the proximal wastewater plumbing and into the sink basin, and are subsequently disbursed onto surrounding surfaces. An aspect of an embodiment of the present invention provides, among other things, a novel device and system (and related method) that heats the tailpiece of the sink drain in order to prevent (e.g., suppress) or inhibit (e.g., reduce) harmful bacteria from moving from a sink's wastewater plumbing to its basin, where it is more likely to reach a patient. An embodiment of the present invention device is, but not limited thereto, small, easy to install, energy efficient, effective, and includes fault detection and fail safes.

An aspect of an embodiment of the present invention provides, among other things, the ability of targeting the surface of the intermediate conduit (e.g., tailpiece) for heating (or heating and drying) and thus is not dependent upon the fluid level in the p-trap as a prerequisite for a heating cycle, allowing it to function continuously as specified (or intermittently) and does not encounter the problems that accompany this dependency known to current devices.

An aspect of various embodiments of the present invention device and system is that it may be relatively inexpensive to build, assemble, fabricate, or manufacture, and yet may vary in design approaches, form, and applications as well.

An aspect of various embodiments of the present invention may provide a number of advantages, such as but not limited thereto, the following:

Device (system) installs directly onto standard tailpieces commonly found in hospitals or other facilities. For example, in an approach the device may be installed integrally with the tailpiece before being implemented with the plumbing system. Alternatively, in an approach the heating device may be installed in the field on an existing tailpiece in place (i.e., in situ) in a plumbing system.

Device (system) does not interact with p-trap water, eliminating the possibility of leaking sewer gas or long periods of inactivity if there has not been recent water flow to refill the p-trap.

Device (system) automatically heats with regular frequency, eliminating the need for manual interaction.

Device (system) is specifically designed to prevent (e.g., suppress) or inhibit (e.g., reduce) biofilm growth in hospital tailpieces and above such tailpieces.

Device (system) is smaller and more discreet than current devices.

Device (system) provides a thermal fuse to prevent overheating of the system (device) and thus the plumbing system and its components.

Device (system) provides visual and/or audible alarms (as well as vibrational alarms) to alert personnel to device failure; as invisible failure of the device would be detrimental, since the biofilms could then grow unbeknownst to personnel.

Device (system) is a long-term solution that requires minimal effort from hospital staff or other personnel.

Device (system) minimizes power consumption and associated costs to hospitals (or other facilities) by heating a minimal segment of wastewater pipe that does not include standing water, and only does so one-quarter of the time or alternatively for a specified duration or frequency as desired or required.

Device (system) provides safety to personnel and patients as various embodiments may operate powered by extra low voltage and therefore eliminating or reducing any harm or bodily injury from electrical shock hazard.

It should be appreciated that any of the components or modules referred to with regards to any of the present invention embodiments discussed herein, may be integrally or separately formed with one another. Further, redundant functions or structures of the components or modules may be implemented. Moreover, the various components may be communicated locally and/or remotely with any user/operator/customer/client/server or machine/system/computer/processor. Moreover, the various components may be in communication via wireless and/or hardwire or other desirable and available communication means, systems and hardware. Moreover, various components and modules may be substituted with other modules or components that provide similar functions.

It should be appreciated that the device and related components discussed herein may take on all shapes along the entire continual geometric spectrum of manipulation of x, y and z planes to provide and meet the anatomical, environmental, and structural demands and operational requirements. Moreover, locations and alignments of the various components may vary as desired or required.

It should be appreciated that various sizes, dimensions, contours, rigidity, shapes, flexibility and materials of any of the components or portions of components in the various embodiments discussed throughout may be varied and utilized as desired or required.

It should be appreciated that while some dimensions are provided on the aforementioned figures, the device may constitute various sizes, dimensions, contours, rigidity, shapes, flexibility and materials as it pertains to the components or portions of components of the device, and therefore may be varied and utilized as desired or required.

Although example embodiments of the present disclosure are explained in detail herein, it is to be understood that other embodiments are contemplated. Accordingly, it is not intended that the present disclosure be limited in its scope to the details of construction and arrangement of components set forth in the following description or illustrated in the drawings. The present disclosure is capable of other embodiments and of being practiced or carried out in various ways.

It must also be noted that, as used in the specification and the appended claims, the singular forms "a," "an" and "the"

include plural referents unless the context clearly dictates otherwise. Ranges may be expressed herein as from "about" or "approximately" one particular value and/or to "about" or "approximately" another particular value. When such a range is expressed, other exemplary embodiments include from the one particular value and/or to the other particular value.

By "comprising" or "containing" or "including" is meant that at least the named compound, element, particle, or method step is present in the composition or article or method, but does not exclude the presence of other compounds, materials, particles, method steps, even if the other such compounds, material, particles, method steps have the same function as what is named.

In describing example embodiments, terminology will be resorted to for the sake of clarity. It is intended that each term contemplates its broadest meaning as understood by those skilled in the art and includes all technical equivalents that operate in a similar manner to accomplish a similar purpose. It is also to be understood that the mention of one or more steps of a method does not preclude the presence of additional method steps or intervening method steps between those steps expressly identified. Steps of a method may be performed in a different order than those described herein without departing from the scope of the present disclosure. Similarly, it is also to be understood that the mention of one or more components in a device or system does not preclude the presence of additional components or intervening components between those components expressly identified.

It should be appreciated that as discussed herein, a subject may be a human or any animal. It should be appreciated that an animal may be a variety of any applicable type, including, but not limited thereto, mammal, veterinarian animal, livestock animal or pet type animal, etc. As an example, the animal may be a laboratory animal specifically selected to have certain characteristics similar to human (e.g. rat, dog, pig, monkey), etc. It should be appreciated that the subject may be any applicable human patient, for example (such as patient, clinician, visitor, technician, occupant, practitioner, etc.).

Some references, which may include various patents, patent applications, and publications, are cited in a reference list and discussed in the disclosure provided herein. The citation and/or discussion of such references is provided merely to clarify the description of the present disclosure and is not an admission that any such reference is "prior art" to any aspects of the present disclosure described herein. In terms of notation, "[n]" corresponds to the n$^{th}$ reference in the list. All references cited and discussed in this specification are incorporated herein by reference in their entireties and to the same extent as if each reference was individually incorporated by reference.

The term "about," as used herein, means approximately, in the region of, roughly, or around. When the term "about" is used in conjunction with a numerical range, it modifies that range by extending the boundaries above and below the numerical values set forth. In general, the term "about" is used herein to modify a numerical value above and below the stated value by a variance of 10%. In one aspect, the term "about" means plus or minus 10% of the numerical value of the number with which it is being used. Therefore, about 50% means in the range of 45%-55%. Numerical ranges recited herein by endpoints include all numbers and fractions subsumed within that range (e.g. 1 to 5 includes 1, 1.5, 2, 2.75, 3, 3.90, 4, 4.24, and 5). Similarly, numerical ranges recited herein by endpoints include subranges subsumed within that range (e.g. 1 to 5 includes 1-1.5, 1.5-2, 2-2.75, 2.75-3, 3-3.90, 3.90-4, 4-4.24, 4.24-5, 2-5, 3-5, 1-4, and 2-4). It is also to be understood that all numbers and fractions thereof are presumed to be modified by the term "about."

The invention itself, together with further objects and attendant advantages, will best be understood by reference to the following detailed description, taken in conjunction with the accompanying drawings.

These and other objects, along with advantages and features of various aspects of embodiments of the invention disclosed herein, will be made more apparent from the description, drawings and claims that follow.

BRIEF DESCRIPTION OF THE DRAWINGS

The foregoing and other objects, features and advantages of the present invention, as well as the invention itself, will be more fully understood from the following description of preferred embodiments, when read together with the accompanying drawings.

The accompanying drawings, which are incorporated into and form a part of the instant specification, illustrate several aspects and embodiments of the present invention and, together with the description herein, serve to explain the principles of the invention. The drawings are provided only for the purpose of illustrating select embodiments of the invention and are not to be construed as limiting the invention.

FIG. 6 schematically illustrates a perspective exploded view of an embodiment of the thermal disinfection system.

FIG. 7A schematically illustrates a perspective view of an aspect of embodiment of the thermal disinfection system disposed upon a liquid-carrying conduit, such as on an intermediate conduit.

FIG. 7B schematically illustrates an enlarged partial view of the aspect of the thermal disinfection system illustrated in FIG. 7A.

FIG. 7C schematically illustrates a plan view of the aspect of the thermal disinfection system with the heating device of FIG. 7A in an open or unrolled position.

DETAILED DESCRIPTION OF EXEMPLARY EMBODIMENTS

Figure 1:
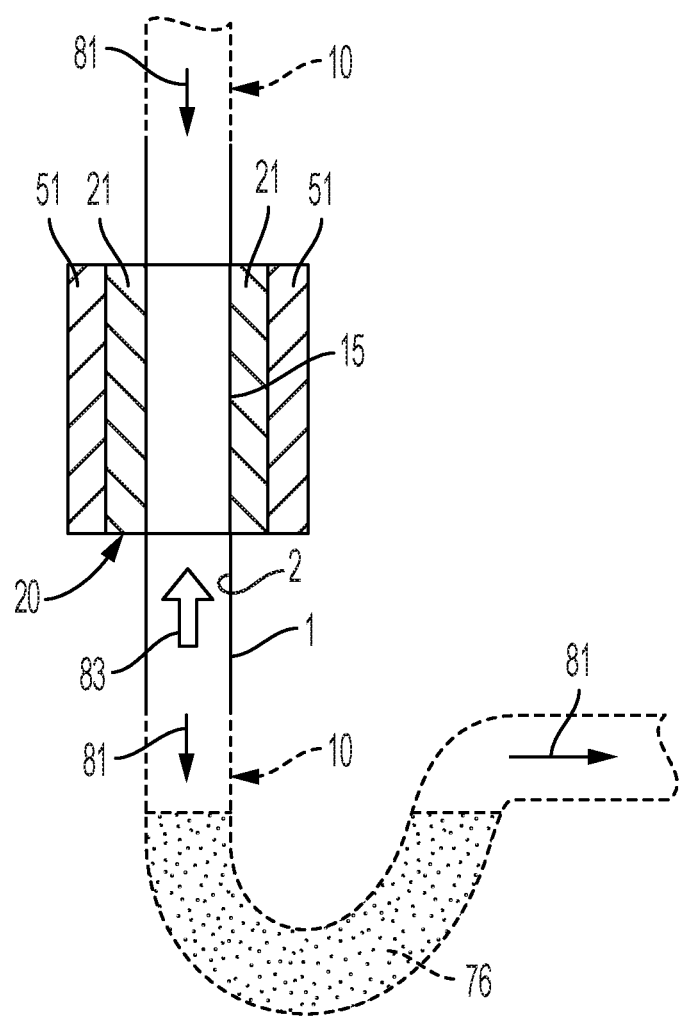
FIG. 1 schematically illustrates an embodiment of the thermal disinfection system implemented with an optional environment plumbing system.

FIG. 1 schematically illustrates an embodiment of the thermal disinfection system 20 implemented with a liquid-carrying conduit 1 associated with a given plumbing system 10 associated with a given environment. For example, a given plumbing system 10 may be associated with an applicable environment that receives or manages liquid, liquid waste or other waste in a liquid waste or liquid direction 81. The thermal disinfection system 20 may comprise a heating device 21 configured for thermal contact with at least a portion of the liquid-carrying conduit 1, thereby defining a thermal contact region 15 of the liquid-carrying conduit 1. Additionally, in an embodiment, a thermal insulating layer 51 may disposed on the heating device 21 configured to be located on a surface of the heating device 21 opposite from the liquid-carrying conduit 1. In an embodiment, the heating device 21 may be configured to heat (or heat and dry) a lumen 2 defined by the liquid-carrying conduit 1 along the thermal contact region 15 (in whole or in part) to a specified temperature to prevent (e.g., suppress) or inhibit (e.g., reduce) microbial activity from advancing through the lumen 2 defined by the liquid-carrying conduit 1. In an embodiment, the microbial activity may include, but not limited thereto, microbial growth and colonization (e.g., unwanted bacterial growth or expansion 83) advancing through the lumen 2 defined by the liquid-carrying conduit 1.

The term "microbial" as defined herein, means related to a microbe or microbes. The term "microbe" is defined herein, means a unicellular or small multicellular organism including bacteria, protozoa, some algae and fungi, viruses, and some worms, such as those that are injurious to other organisms.

An example of microbial growth may include, but not limited thereto, bacterial growth. Bacterial growth may include, but not limited thereto, multiplying bacteria.

An example of microbial colonization may include, but not limited thereto, bacterial colonization. Bacterial colonization may include, but not limited thereto, biofilm establishment.

An example of microbial growth may include, but not limited thereto, bacterial growth and bacterial colonization.

In an embodiment, the heating device 21 may be configured to heat (or heat and dry) a lumen 2 defined by the liquid-carrying conduit 1 along the thermal contact region 15 (in whole or in part) to a specified temperature to prevent (e.g., suppress) or inhibit (e.g., reduce) bacterial activity from advancing through the lumen 2 defined by the liquid-carrying conduit 1. Various embodiments of the present invention may be effective and applicable on any bacteria. For example, but not limited thereto, the bacteria may include at least one or more of any combination of the following: *Escherichia coli* (*E. coli*), *Enterobacter cloacae*, *Pantoea*, *Klebsiella pneumoniae* and *Kluyvera*.

For example, but not limited thereto, single-organism tests were run against *E. coli* and *Pantoea* species.

Various embodiments of the present invention may be effective and applicable on any microbial activity. For example, the microbial activity may include bacterial growth and colonization. For example, but not limited thereto, the bacterial growth and colonization may include at least one or more bacteria discussed in the references cited herein (See D, N, O, P, Q).

Without wishing to be bound by any particular theory, it is hypothesized herein that various embodiments of the present invention would be effective and applicable on any bacteria or any antibiotic-resistant bacteria.

Without wishing to be bound by any particular theory, it is hypothesized herein that various embodiments of the present invention would be effective and applicable on any microbe.

Without wishing to be bound by any limitations, in an embodiment, the heating device 21 may be configured to heat (or heat and dry) a lumen 2 defined by the liquid-carrying conduit 1 along the thermal contact region 15 (in whole or in part) to a specified temperature to prevent (e.g., suppress) or inhibit (e.g., reduce) bacterial growth and bacterial colonization from advancing through the lumen 2 defined by the liquid-carrying conduit 1. In an embodiment, the heating device 21 may be configured to prevent or inhibit the growth of actively multiplying microbes on the interior of the intermediate conduit 11 at and extending beyond, in the proximal direction, in alignment with the thermal contact region 15 and in and through the proximal conduit 61 (intermediate conduit 11 and proximal conduit 61, which are discussed below).

Without wishing to be bound by any limitations, in an embodiment, the heating device 21 may be configured to prevent or inhibit the microbial active biofilm establishment from forming on the interior (e.g., inner lumen 13, which is discussed below) of the intermediate conduit 11 at and extending beyond, in the proximal direction, in alignment with the thermal contact region 15 and into and through the proximal conduit 61.

Without wishing to be bound by any limitations, in an embodiment, the heating device 21 may be configured to prevent or inhibit bacterial motility. In an embodiment, the heating device 21 may be configured to prevent or inhibit the effects due to convective transport of the bacteria due to, for example, water flowing or splashing.

Figure 2:
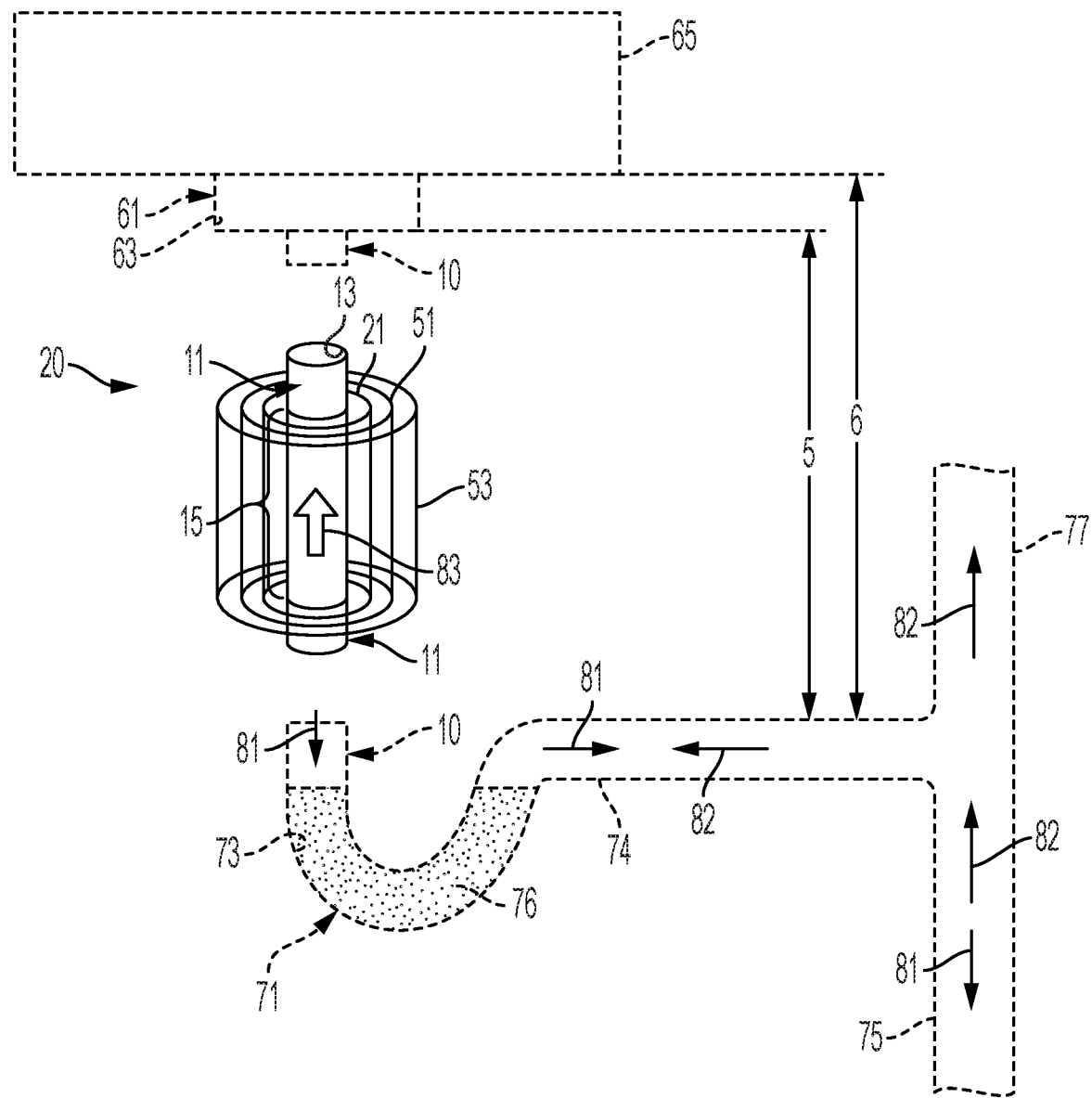
FIG. 2 schematically illustrates an embodiment of the thermal disinfection system not yet connected to full the environment plumbing system and whereby a portion of the system is integrally formed, fabricated, or manufactured with the liquid-carrying conduit, such as an intermediate conduit.

FIG. 2 schematically illustrates an embodiment of the thermal disinfection system 20 not yet connected to the full environment plumbing system 10 and whereby a portion of the thermal disinfection system 20 is integrally formed, fabricated, or manufactured with the liquid-carrying conduit, such as an intermediate conduit 11. The heating device 21 may be integrally formed onto or installed with the intermediate conduit 11 (i.e., tailpiece) prior to the intermediate conduit 11 being joined with the rest of the plumbing system 10. Once the heating device 21 is assembled or fabricated in advance onto the intermediate conduit 11 and then in turn the intermediate conduit 11 can then be connected to the environment plumbing system 10 such as to the proximal conduit 61 and distal conduit 71 or the like. The thermal insulator layer 51 and housing 53 may be assembled or fabricated with the heating device 21 either before or after (or a combination thereof) the intermediate conduit 11 is connected to the environment plumbing system 10. Still referring to FIG. 2, the intermediate conduit 11 and inner lumen 13 may be any liquid-carrying conduit 1 and lumen 2 defined by the liquid-carrying conduit 1 (such as discussed in FIG. 1, for example) for any varied or given plumbing system for any applicable environment.

Still yet referring to FIG. 2, the environment plumbing system 10 may include a proximal conduit 61 and fixture 65, and is further illustrated with liquid waste direction 81, gas direction 82, and standing liquid waste 76 in relation to illustrative distal conduit 71, trap arm 74, drainage pipe 75, and vent pipe 77. Also illustrated is the relative clearance, space or distance available to install the heating device 21 and related components such as between the trap arm 74 and the proximal conduit 61 (designated as 5, representing the proximal conduit clearance or distance) and the trap arm 74 and the fixture 65 (designated as 6, representing the fixture clearance or distance).

Figure 3:
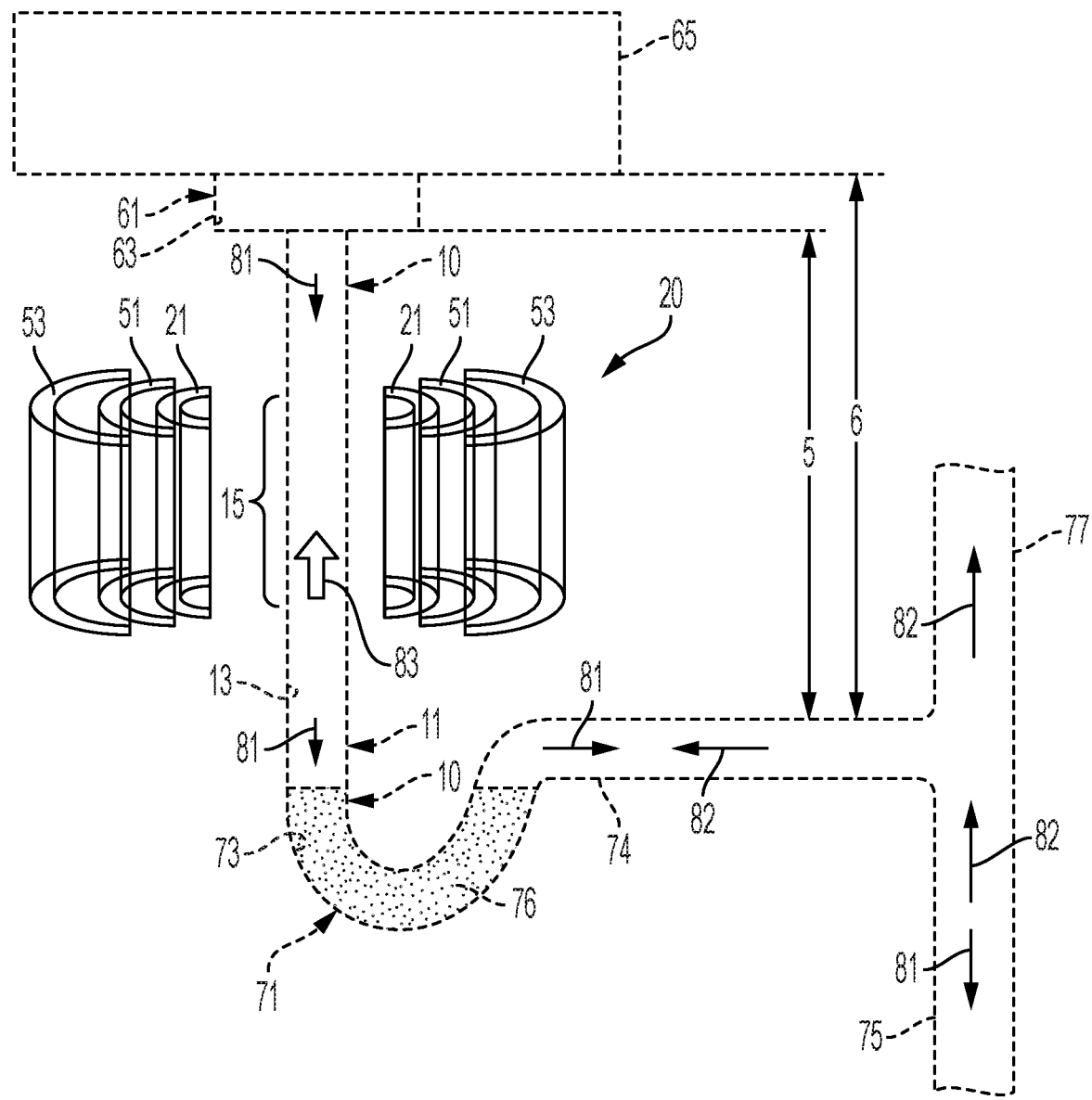
FIG. 3 schematically illustrates an embodiment of the thermal disinfection system that is not yet connected to the existing environment plumbing system that is in place (in situ); and whereby a portion can be separately provided onto the liquid-carrying conduit, such as an intermediate conduit or is in attachable relation (or both attachable relation and removable relation) to the intermediate conduit.

FIG. 3 schematically illustrates an embodiment of the thermal disinfection system 20 that is not yet connected to the existing environment plumbing system 10 that is in place (in situ). The thermal disinfection system 20 is not yet installed and may be configured whereby a portion of the thermal disinfection system 20 (or the entire system) can be separately provided onto the liquid-carrying conduit, such as an intermediate conduit 11. A portion of the thermal disinfection system 20 (or the entire system) may be provided in attachable relation (or both an attachable relation and a removable relation) to the intermediate conduit 11. The heating device 21 may be readily added (or both added and removed) to a given or existing intermediate conduit 11 (i.e., tailpiece) or the like. The heating device 21 may come as a module format or design in a variety of sizes and contours and consequently shall be compatible to any size or shaped intermediate conduit 11 or the like. The heating device 11 may be of snap-fit design or other attachment fit device design (or mechanism or material) to mount to the existing intermediate conduit 11 or the like. The thermal insulator layer 51 and housing 53 (and other related and associated components) may be assembled with similar attachable characteristics (or both attachable and removable characteristics) as the heating device 21. Accordingly, the heating device 11, thermal insulator layer 51 and housing 53 (and other related and associated components) can be installed in place (in situ) on an environment plumbing system 10 without the requirement of adjusting, altering, or removing the existing intermediate conduit 11. Still referring to FIG. 3, the intermediate conduit 11 and inner lumen 13 may be any liquid-carrying conduit 1 and lumen 2 defined by the liquid-carrying conduit 1 (such as discussed in FIG. 1, for example) for any varied or given plumbing system for any applicable environment.

Still yet referring to FIG. 3, the environment plumbing system 10 may include a proximal conduit 61 and fixture 65 or the like, and is further illustrated with liquid waste direction 81, gas direction 82, and standing liquid waste 76 in relation to illustrative distal conduit 71, trap arm 74, drainage pipe 75, and vent pipe 77. Also illustrated is the relative clearance, space or distance available to install the heating device 21 and related components such as between the trap arm 74 and the proximal conduit 61 (designated as 5, representing the proximal conduit clearance or distance) and the trap arm 74 and the fixture 65 (designated as 6, representing the fixture clearance or distance).

Figure 4:
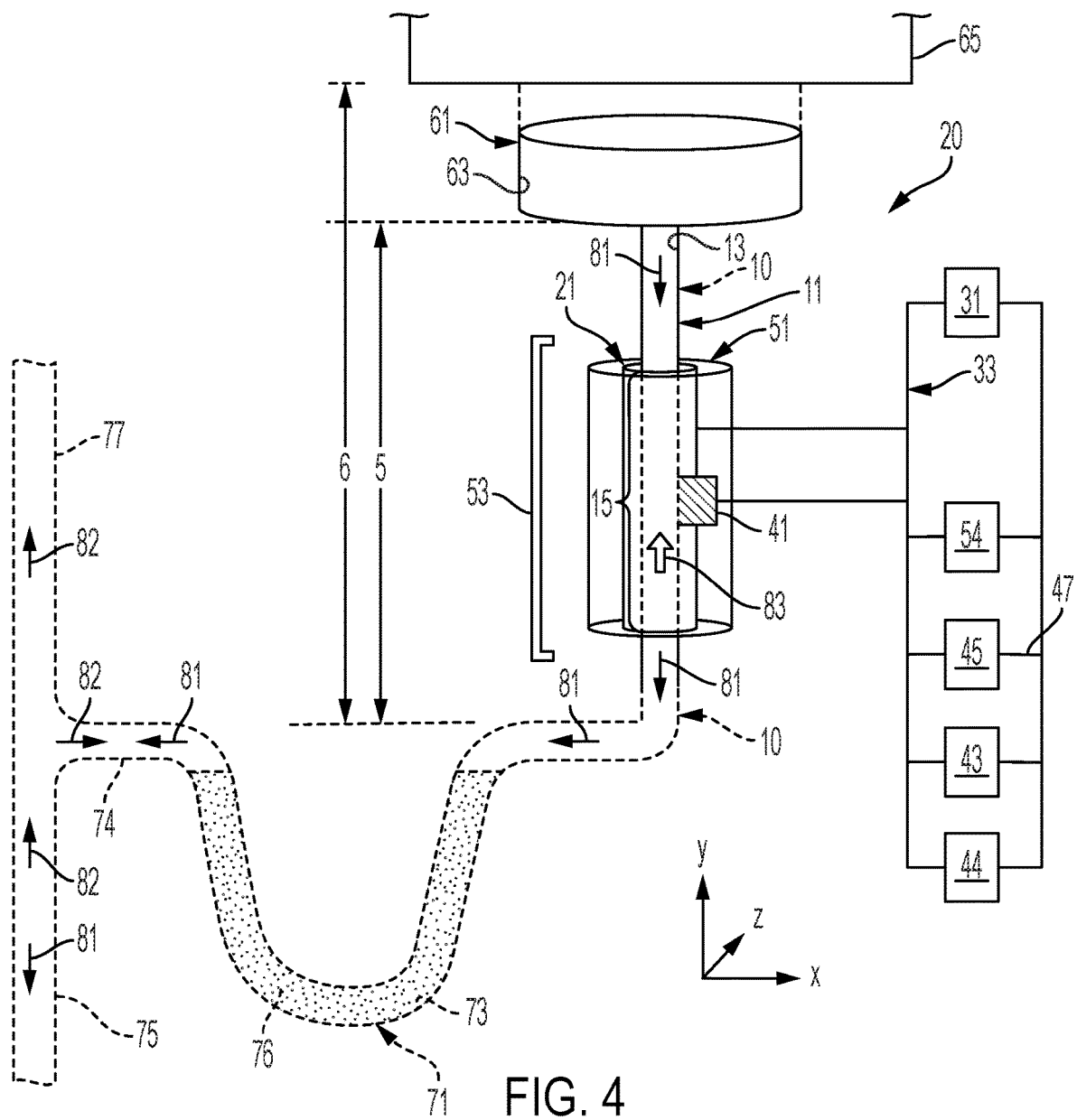
FIG. 4 schematically illustrates an embodiment of the thermal disinfection system connected to the environment plumbing system and whereby the environment plumbing system may allow for standard clearance, space, or distance to accommodate the heating device and related components or portions of the liquid-carrying conduit, such as between the distal conduit and the proximal conduit or fixture.

FIG. 4 schematically illustrates an embodiment of the thermal disinfection system 20 connected to the environment plumbing system 10 and whereby a portion of the thermal disinfection system 20 is disposed on the liquid-carrying conduit, such as an intermediate conduit 11. In an embodiment, the environment plumbing system 10 may allow for standard clearance, space or distance to accommodate the heating device 21 and related components or portions of the liquid-carrying conduit, such as the intermediate conduit 11 and between the distal conduit 71 and the proximal conduit 61 or fixture 65 (or other targeted or intended areas or regions for installation). It should be appreciated that FIG. 4 is not provided to scale and that the proximal conduit clearance or distance 5 and fixture clearance or distance 6 may vary; and thus the heating device 21 and related components may be customized and designed for tailored fit and space. For example, in an embodiment the proximal conduit clearance or distance 5 and fixture clearance or distance 6 are similar, and may not exceed twelve inches and can be as short as three inches. In other embodiments, for example, the proximal conduit clearance or distance 5 and fixture clearance or distance 6 may be greater than about twelve inches or less than about three inches (or in a range between about twelve inches to about three inches). An advantage associated with various embodiments is the ability to be compatible to fit within a variety of environment plumbing systems 10. While the portions of intermediate conduit 11 are illustrated primarily aligned in the y-axis, it should be appreciated that the portions of the intermediate conduit 11 may be also aligned in the x-axis and z-axis as well. It should be appreciated that portions of the heating device 21 (as well as the intermediate conduit 11) may take on all directions and shapes along the entire continual geometric spectrum of manipulation of x, y and z planes to provide and meet the environmental and structural demands, real estate (i.e., space), and operational requirements. Similarly, other components (or portions of components) of the thermal disinfection system 20 may take on all directions and shapes along the entire continual geometric spectrum of manipulation of x, y and z planes to provide and meet the environmental, real estate (i.e., space), and structural demands and operational requirements. Moreover, locations and alignments of the various components of the thermal disinfection system 20 may vary as desired or required.

Figure 5:
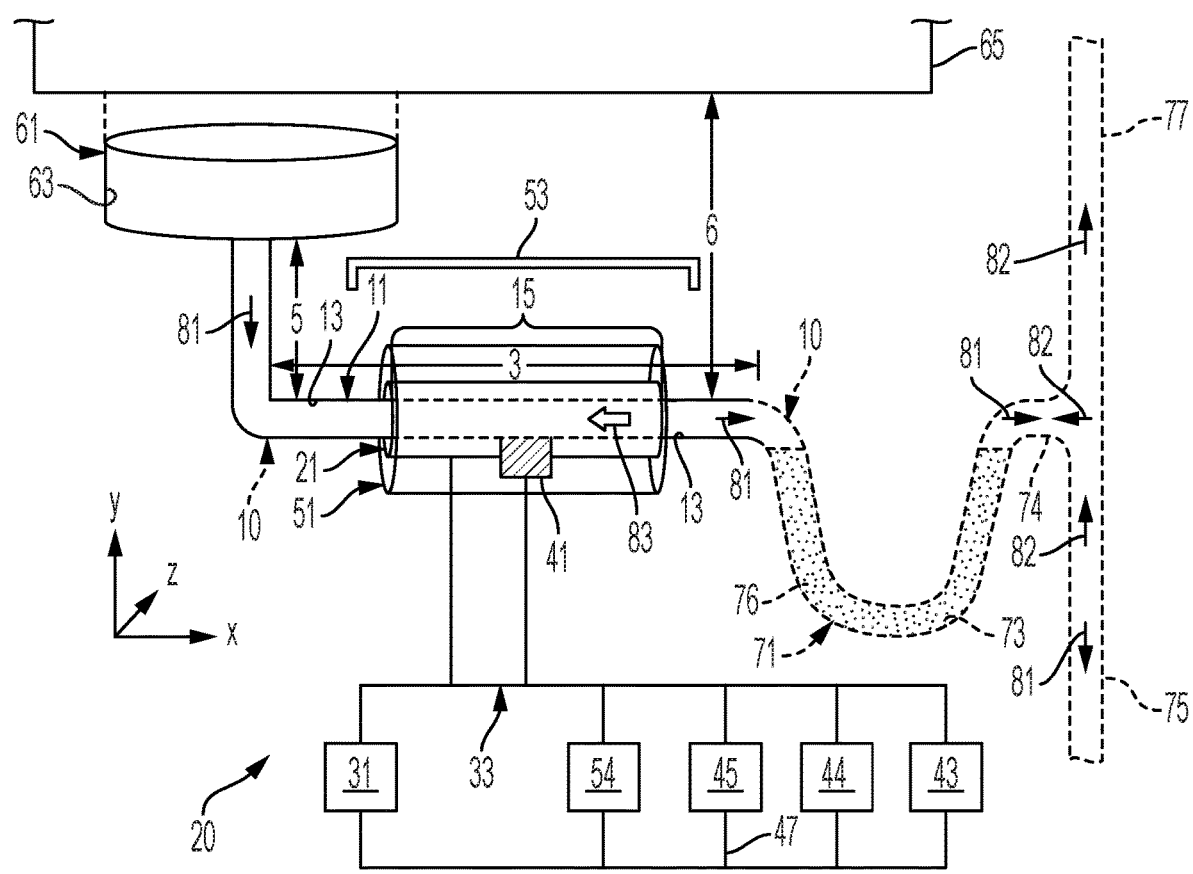
FIG. 5 schematically illustrates an embodiment of the thermal disinfection system connected to the environment plumbing system and whereby the environment plumbing system allows for reduced clearance, space, or distance (such as Americans with Disabilities Act (ADA) compliant design or "offset" drain design) to accommodate the heating device and related components or portions of the liquid-carrying conduit, such as along the intermediate conduit and between the distal conduit and the proximal conduit or fixture.

FIG. 5 schematically illustrates an embodiment of the thermal disinfection system 20 connected to the environment plumbing system 10 and whereby a portion of the thermal disinfection system 20 is disposed on the liquid-carrying conduit, such as an intermediate conduit 11. In an embodiment, the environment plumbing system 10 may allow for reduced clearance, space, or distance (such as for Americans with Disabilities Act (ADA) compliant design or "offset" drain design, as well as other specialized environments) to accommodate the heating device 21 and related components or portions of the liquid-carrying conduit, such as the intermediate conduit 11 and between the distal conduit 71 and the proximal conduit 61 or fixture 65 (or other targeted or intended areas or regions for installation). The environment plumbing system 10 may include the fixture 65, and is further illustrated with liquid waste direction 81, gas direction 82, and standing liquid waste 76 in relation to the illustrated distal conduit 71, trap arm 74, drainage pipe 75, and vent pipe 77. While the portions of the intermediate conduit 11 are illustrated primarily aligned in both the y-axis and x-axis, it should be appreciated that the portions of intermediate conduit 11 may also be aligned in the z-axis as well. It should be appreciated that portions of the heating device 21 (as well as the intermediate conduit 11) may take on all directions and shapes along the entire continual geometric spectrum of manipulation of x, y and z planes to provide and meet the environmental and structural demands and operational requirements. For example, while the intermediate conduit 11 is illustrated substantially in the horizontal direction (e.g., x-axis), it may also be angled from the horizontal plane in any variety of degrees (and including any angle from the x-axis, y-axis, or z-axis). Similarly, components (or portions of components) of the thermal disinfection system 20 may take on all directions and shapes along the entire continual geometric spectrum of manipulation of x, y and z planes to provide and meet the environmental, real estate (i.e., space), and structural demands and operational requirements. Moreover, locations and alignments of the various components of the thermal disinfection system 20 may vary as desired or required.

In ADA sinks, for example as shown in FIG. 5 (as well in FIG. 10), the clearance distance 5 may be as small as, for example, about ⅛ of an inch. The clearance distance 6 may be, about two inches, the latter varying greatly depending on the sink or fixture of the plumbing system. These distances may be extremely variable depending on the given environment or plumbing system. For example, the clearance distance 5 may be equal to, greater than or less than about ⅛ of an inch. For example, the clearance distance 6 may be equal to, greater than or less than about two inches.

Additionally, another constraint on ADA sinks or "offset" drain design sinks is not only the clearance distances 5 and 6, but also the length of the horizontal portion or longitudinal, i.e., the clearance distance 3 such as the horizontal portion or longitudinal portion of the intermediate conduit 11 in FIG. 5. This clearance distance 3 may be, for example, only about 1.7 inches thereby resulting in a very tough design constraint. An advantage associated with various embodiments is the ability to be compatible to fit within the constraints of a variety of environment plumbing systems 10. For example, the clearance distance 3 may be equal to, greater than or less than about 1.7 inches.

Referring to FIGS. 4 and 5, the thermal disinfection system 20 may include the heating device 21 disposed along a longitudinal span or portion on the liquid-carrying conduit, such as the intermediate conduit 11 to define the thermal contact region 15. In an embodiment, the thermal contact region 15 may represent the location of which the heating device 21 is in contact with the intermediate conduit 11. The intermediate conduit 11 includes an inner lumen 13. The intermediate conduit 11 and inner lumen 13 may be any liquid-carrying conduit 1 and lumen 2 defined by the liquid-carrying conduit 1 (such as discussed in FIG. 1, for example) for any varied or given plumbing system for any applicable environment. Also included is a thermal insulating layer or component 51. A temperature sensor 41 may be disposed at the thermal contact region 15 on the intermediate conduit 11. The heating device 21 and temperature sensor 41 may be in communication on a circuit 33 having a controller 31, a visual indicator device 43, an audio indicator device 44, a thermal fuse 45, cutoff fault circuit or detection 47, and power supply 54 (or connection to a power supply). A housing 53 may be provided (or plurality of housings) to enclose or mount the various related components of the thermal disinfection system 20 so as to be contained in a single housing or split among multiple housings. One or more housings 53 may enclose or mount any combination of one or more of the following: the heating device 21, thermal insulating layer or component 51, temperature sensor 41, thermal contact region 15, circuit 33, controller 31, visual indicator device 43, audio indicator device 44, thermal fuse 45, cutoff fault circuit or detection 47, and power supply 54 (or connection to a power supply), as well as any other components to be implemented that are related to the thermal disinfection system 20.

Next, turning to FIG. 5, also illustrated is the relative clearance, space or distance available to install the heating device 21 and related components such as between: the trap arm 74 and the proximal conduit 61 (designated as 5, representing proximal conduit clearance or distance); the trap arm 74 and the fixture 65 (designated as 6, representing fixture clearance or distance); and the longitudinal span of the intermediate conduit 11 (designated as 3, intermediate clearance or distance as shown in FIG. 5). The proximal conduit 61 has an inner lumen 63. The environment plumbing system 10 includes the fixture 65, and is further illustrated with liquid waste direction 81, gas direction 82, and standing liquid waste 76 in relation to the illustrated distal conduit 71, trap arm 74, drainage pipe 75, and vent pipe 77.

FIG. 6 schematically illustrates a perspective exploded view of an embodiment of the thermal disinfection system 20 that may include a heating device 21 intended to be disposed along a span of the liquid-carrying conduit, such as an intermediate conduit 11 having an inner lumen 13. The intermediate conduit 11 and inner lumen 13 may be any liquid-carrying conduit 1 and lumen 2 defined by the liquid-carrying conduit 1 (such as discussed in FIG. 1, for example) for any varied or given plumbing system for any applicable environment. Also included may be a thermal insulating layer or component 51, a temperature sensor 41, a visual indicator device 43, a thermal fuse 45, and power supply wire, circuit or transmission line 55 in communication with the heating device 21. One or more transmission lines may be provided in communication with the various components, such as the thermal fuse, temperature sensor, etc. A housing 53 may be provided in two portions as a clamshell feature. Mountable on the housing is a control board or circuit board 35 to secure a controller or processor 31. Moreover, an outer housing or shroud 60 may be provided that may surround or slide over the housing 53, and which may have an attachment means 42 such as a nut or other type fittings or anchors to secure the visual indicator device 43. Also shown are an O-ring seat 56 and O-ring 57 configured to help mate the housings 53, 60 (e.g., to seal them against water intrusion or other environmental elements) and intermediate conduit 11 together or in place. In an embodiment, the thermal insulating layer or component 51 may be a thermal pad or mat type.

FIG. 7A schematically illustrates a perspective view of an embodiment of the thermal disinfection system 20 that includes a heating device 21 disposed on a liquid-carrying conduit, such as an intermediate conduit 11. As illustrated, the heating device 21 is wrapped around a longitudinal span or portion of the intermediate conduit 11 defining a thermal contact region 15, i.e., the location of which the heating device 21 is in contact with the intermediate conduit 11. The intermediate conduit 11 includes in inner lumen 13. The intermediate conduit 11 and inner lumen 13 may be any liquid-carrying conduit 1 and lumen 2 defined by the liquid-carrying conduit 1 (such as discussed in FIG. 1, for example) for any varied or given plumbing system for any applicable environment. FIG. 7B schematically illustrates an enlarged partial view of the thermal disinfection system illustrated in FIG. 7A, wherein the heating device 21 may be a mat or panel that wraps the intermediate conduit 11 making an interlocking seam (e.g., tongue and groove like) that reveals a portion of the backing material 24 (or adhesive backing material) that is provided behind the mat or panel of the heating device 21. For example, the interlocking seam coverage eliminates the possibility of allowing a linear path for bacteria to follow that might be less well heated than neighboring areas. FIG. 7C schematically illustrates a plan view of an embodiment of the thermal disinfection system 20 with the heating device 21 of FIG. 7A having a backing material 24 (or adhesive backing material) in an open or unrolled position. Also included is a temperature sensor 41, a thermal fuse 45, and power supply wire, circuit or transmission line 55 in communication with the heating device 21.

Figure 8:
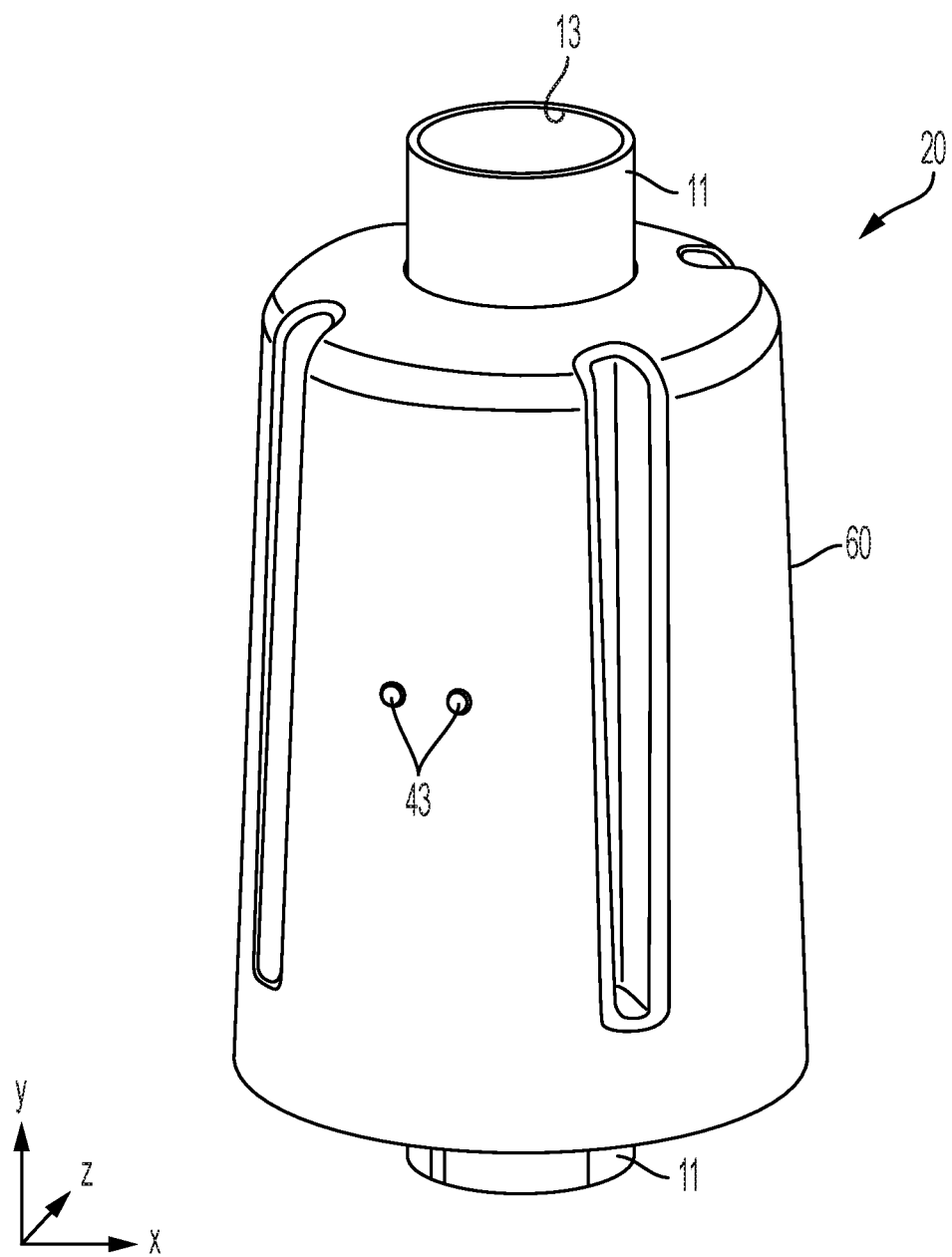
FIG. 8 schematically illustrates a perspective side view of an embodiment of the thermal disinfection system installed on a liquid-carrying conduit, such as an intermediate conduit surrounded by a housing.

FIG. 8 schematically illustrates a perspective side view of an embodiment of the thermal disinfection system 20 installed on a liquid-carrying conduit, such as an intermediate conduit 11 having an inner lumen 13 surrounded by an outer housing or shroud 60.

Figure 9:
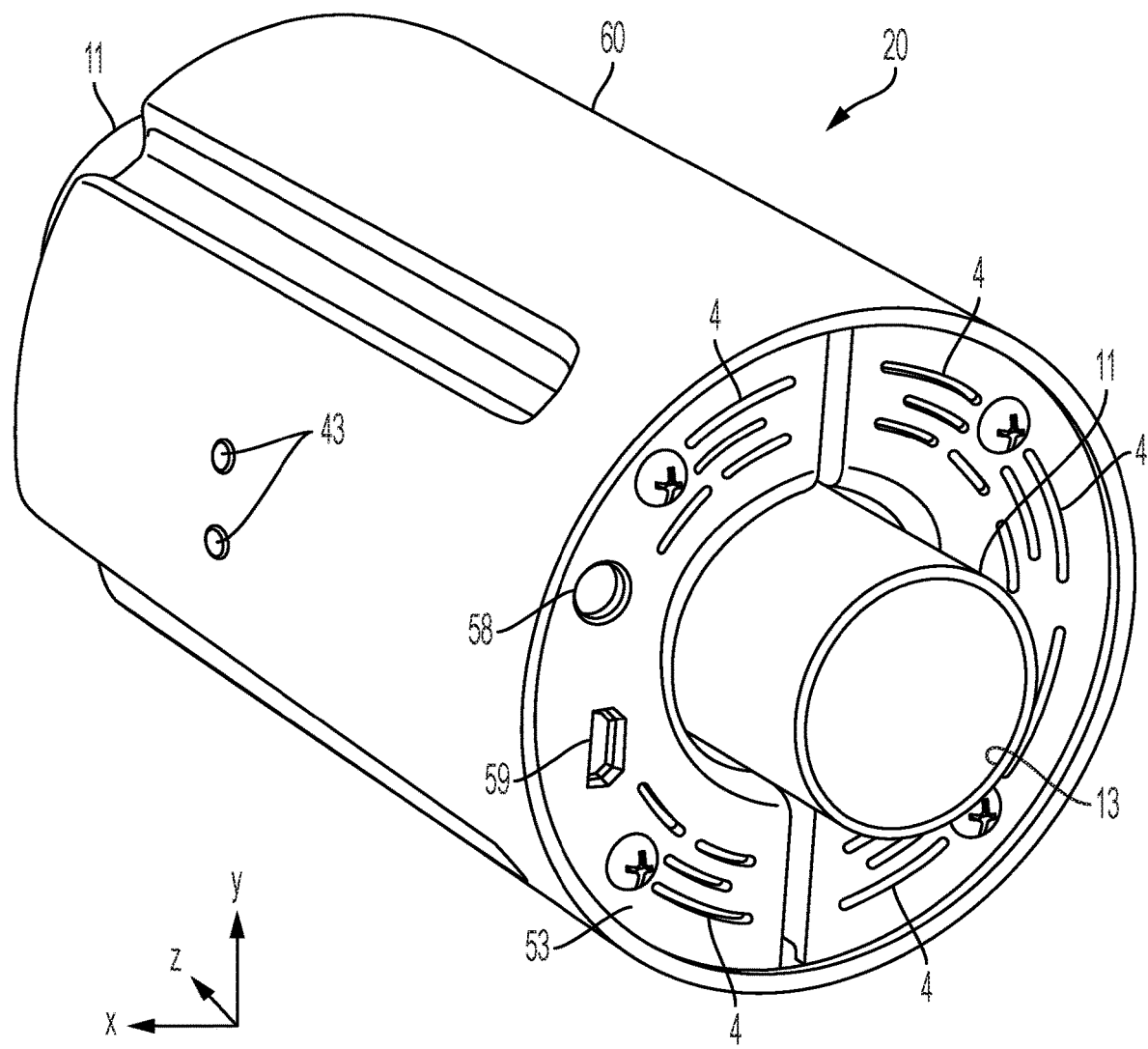
FIG. 9 schematically illustrates a perspective end view of an embodiment of the thermal disinfection system installed on a liquid-carrying conduit, such as an intermediate conduit surrounded by a housing.

FIG. 9 schematically illustrates a perspective end view of an embodiment of the thermal disinfection system 20 installed on a liquid-carrying conduit, such as an intermediate conduit 11 having an inner lumen 13 surrounded by a housing 53 enclosed by the outer housing or shroud 60.

Still referring to FIGS. 8 and 9, also shown are the housing 53 and outer housing 60 providing visual indicator device 43, port for a power supply or power lug 58 and a port for data transmission or communication 59 (e.g., USB port or micro USB port), which is shown in FIG. 9. Also, vents 4 may be provided (as shown in FIG. 9), such as located on surface of the housing 53 to help keep the electronics cool, for example. FIGS. 8 and 9 are shown wherein the intermediate conduit 11 and inner lumen 13 are aligned in the y-axis and z-axis, respectively.

Figure 10:
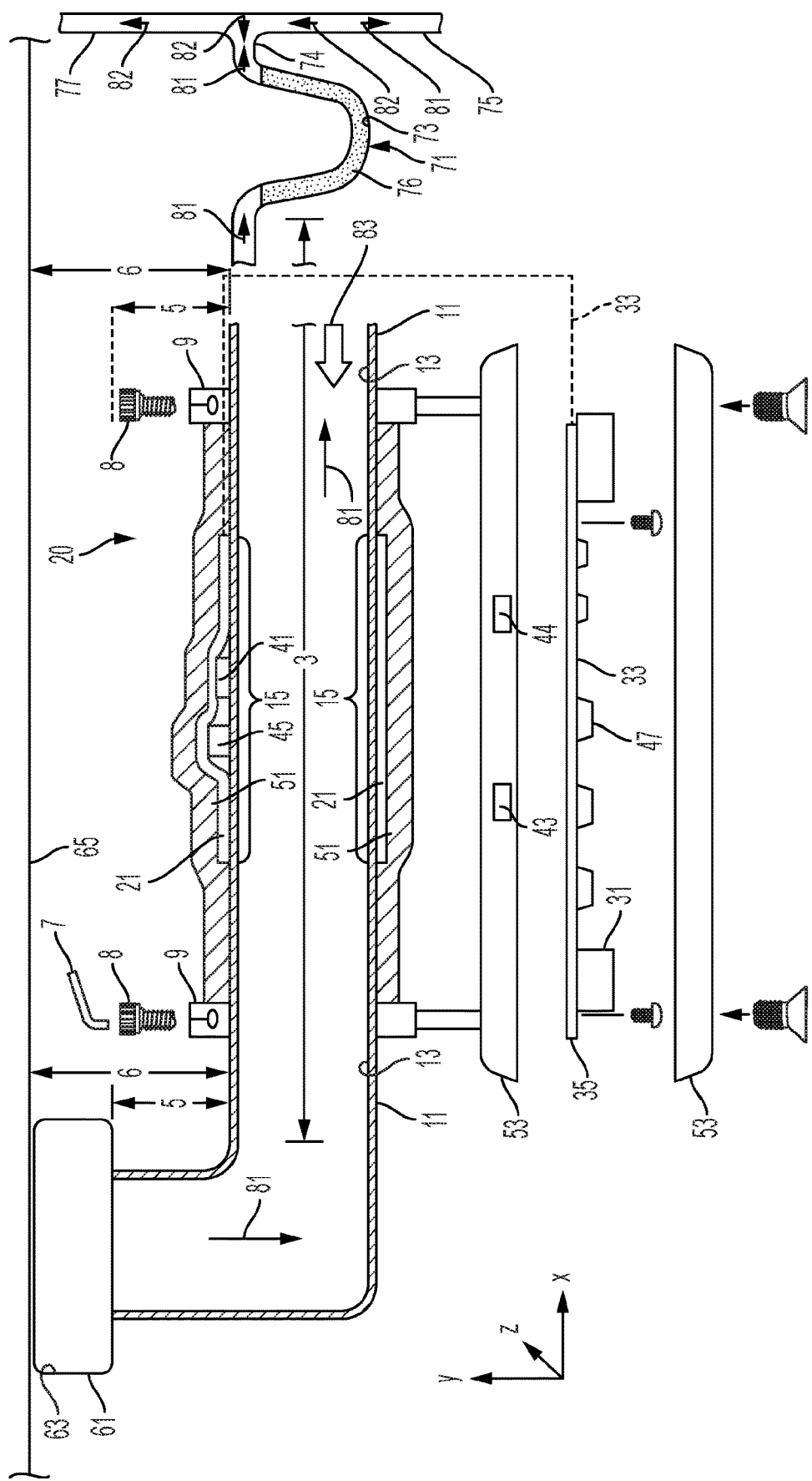
FIG. 10 schematically illustrates an embodiment of the thermal disinfection system connected to the environment plumbing system and whereby the environment plumbing system allows for reduced clearance, space, or distance (such as Americans with Disabilities Act (ADA) compliant design or "offset" drain design) to accommodate the heating device and related components or portions of the liquid-carrying conduit, such as along the intermediate conduit and between the distal conduit and the proximal conduit or fixture.

FIG. 10 schematically illustrates an embodiment of the thermal disinfection system 20 connected to the environment plumbing system and whereby the environment plumbing system allows for reduced clearance, space, or distance (such as Americans with Disabilities Act (ADA) compliant design or "offset" drain design) to accommodate the heating device and related components or portions of the liquid-carrying conduit, such as between the distal conduit 71 and the proximal conduit 61 or fixture 65.

Referring to FIG. 10, the thermal disinfection system 20 may include the heating device 21 disposed along a longitudinal span or portion of a liquid-carrying conduit, such as the intermediate conduit 11 to define the thermal contact region 15. In an embodiment, the thermal contact region 15 may represent the location of which the heating device 21 is in contact with the liquid-carrying conduit, such as intermediate conduit 11. The intermediate conduit 11 includes an inner lumen 13. The intermediate conduit 11 and inner lumen 13 may be any liquid-carrying conduit 1 and lumen 2 defined by the liquid-carrying conduit 1 (such as discussed in FIG. 1, for example) for any varied or given plumbing system for any applicable environment. While the portions of the intermediate conduit 11 are illustrated primarily aligned in both the y-axis and x-axis, it should be appreciated that the portions of the heating device 21 (as well as the intermediate conduit 11) may also be aligned in the z-axis as well. It should be appreciated that portions of the heating device 21 (as well as the intermediate conduit 11) may take on all directions and shapes along the entire continual geometric spectrum of manipulation of x, y and z planes to provide and meet the environmental, real estate (space), and structural demands and operational requirements. Similarly, components (or portions of components) of the thermal disinfection system 20 herein may take on all directions and shapes along the entire continual geometric spectrum of manipulation of x, y and z planes to provide and meet the environmental, real estate (space), and structural demands and operational requirements. Moreover, locations and alignments of the various components of the thermal disinfection system 20 may vary as desired or required.

Still referring to FIG. 10, also included is a thermal insulating layer or component 51. A temperature sensor 41 is disposed at the thermal contact region 15 on the intermediate conduit 11. The heating device 21 and temperature sensor 41 may be in communication on a circuit 33 having a controller 31, a visual indicator device 43, an audio indicator device 44, a thermal fuse 45, cutoff fault circuit or detection 47, and power supply 54 (or connection to a power supply; and not shown). A housing 53 is provided and is illustrated in an exploded view format with various mounting or attaching material or hardware such as a clamp 9, clamp fastener 8 such as a bolt or screw, and tool 7 such as a wrench or screwdriver. The housing 53 is provided to enclose or mount the various related components of the thermal disinfection system 20 so as to be contained in a single housing or split among multiple housings. One or more housings 53 may enclose or mount any combination of one or more of the following: the heating device 21, thermal insulating layer or component 51, temperature sensor 41, thermal contact region 15, circuit 33, controller 31, visual indicator device 43, audio indicator device 44, thermal fuse 45, cutoff fault circuit or detection 47, and power supply 54 (or connection to a power supply; and now shown); as well as any other components as desired or required. Still referring to FIG. 10, also illustrated is the relative clearance, space or distance available to install the heating device 21 and related components such as between: the trap arm 74 and the proximal conduit 61 (designated as 5, representing proximal conduit clearance or distance); the trap arm 74 and the fixture 65 (designated as 6, representing fixture clearance or distance); and the longitudinal span of the intermediate conduit 11 (designated as 3, intermediate clearance or distance). The proximal conduit 61 has an inner lumen 63. The environment plumbing system includes the fixture 65, and is further illustrated with liquid waste direction 81, gas direction 82, and standing liquid waste 76 in relation to illustrative distal conduit 71, trap arm 74, drainage pipe 75, and vent pipe 77. As illustrated, the housing 53 is disposed adjacent to intermediate conduit 11 opposite the proximal conduit 61 and fixture 65 for space-savings benefit for such circumstances when clearance 3, 5, and 6 may be minimal, constraining, or challenging.

Figure 13:
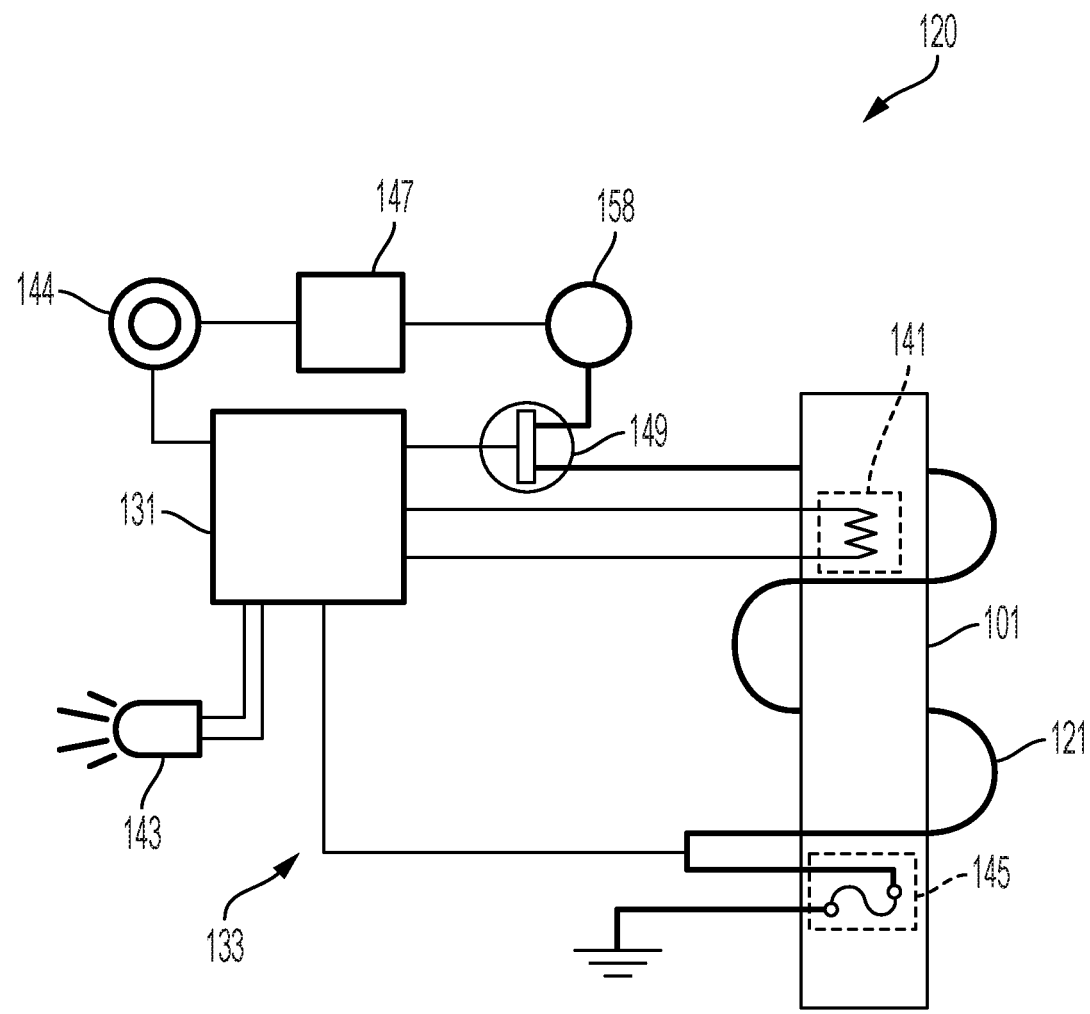
FIG. 13 schematically illustrates a circuit diagram associated with an embodiment of the thermal disinfection system.

FIG. 13 schematically illustrates a thermal disinfection system 120 for use with a liquid carrying conduit 101, such as an intermediate conduit, a proximal conduit, portions of a distal conduit, or the like. The thermal disinfection system 120 includes a circuit 133 as schematically shown as part of the represented circuit diagram. The liquid-carrying conduit 101 may be enveloped by a heating device 121 such as, for example, a resistive heating element. Electric current to the heating device 121 may switched by a solid state device 149, such as solid-state relay (SSR), transistor, thyristor, or the like, and that which may be controlled by a controller 131 such as a microcontroller, microprocessor, processor, or controller. The circuit 133 may be powered by an external power supply 158. The temperature of the liquid carrying conduit 101 is monitored by a temperature sensor 141, and regulated to a specified or predetermined target value or values. A thermal fuse 145 may be adhered to the liquid-carrying conduit 101 and opens if the temperature is too high. The status of the thermal fuse 145 may be monitored by the controller 131. Power failure may be detected by a cut off fault circuit 147, which may trigger an audible alarm or device 144 and/or visual indicator or device 143 such as a light emitting diode (LED). The audible alarm 144 and visual indicators 143 may also be activated by the controller 131 to report status and errors, for example.

EXAMPLES

Practice of an aspect of an embodiment (or embodiments) of the invention will be still more fully understood from the following examples and experimental results, which are presented herein for illustration only and should not be construed as limiting the invention in any way.

Example and Experimental Results Set No. 1

An aspect of an embodiment of the present invention provides, among other things, a device, system, and related method that heats (or heats and dries) the tailpiece of the sink to prevent (e.g., suppress) or inhibit (e.g., reduce) biofilms from forming along its wall, barring upward growth or motility of the bacteria from the p-trap (or other type of trap or distal wastewater plumbing) to the sink basin or other fixture. The p-trap is a known liquid reservoir for these pathogens. In an embodiment of the prototype thermal disinfection system, the tailpiece is heated to 75° C. for 1 hour every 4 hours rather than continuously; this is a strategy helpful to reduce energy consumption. The system includes a failsafe against uncontrolled heating, and fault detection.

Figure 11A:
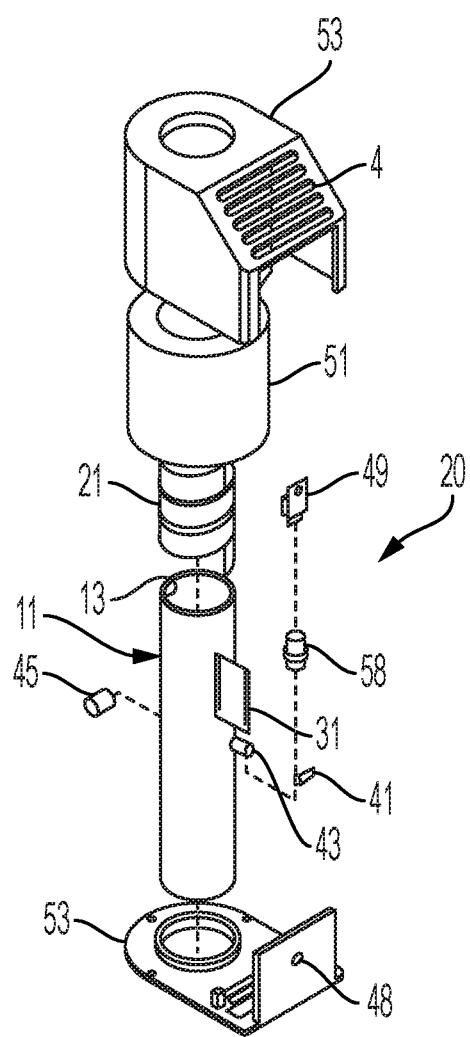
FIG. 11A schematically illustrates a perspective exploded view of an embodiment of the thermal disinfection system.
Figure 11B:
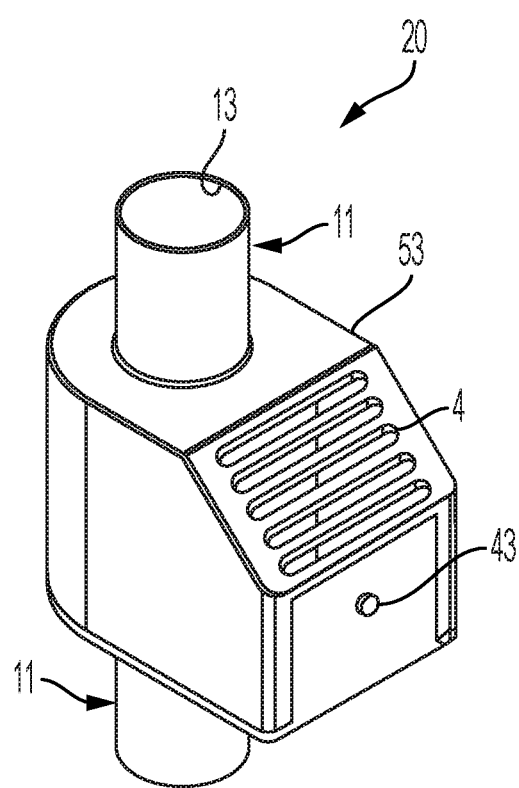
FIG. 11B schematically illustrates a perspective assembled view of an embodiment of the thermal disinfection system illustrated in FIG. 11A.

FIG. 11A schematically illustrates a perspective exploded view of an embodiment of the thermal disinfection system 20. FIG. 11B schematically illustrates a perspective assembled view of an embodiment of the thermal disinfection system 20 illustrated in FIG. 11A. For example, referring to FIG. 11A, the thermal disinfection system 20 is provided around the intermediate conduit 11 (such as a standard tailpiece of 1.25 inches in diameter) that includes an inner lumen 13. The intermediate conduit 11 and inner lumen 13 may be any liquid-carrying conduit 1 and lumen 2 defined by the liquid-carrying conduit 1 (such as discussed in FIG. 1, for example) for any varied or given plumbing system for any applicable environment. The thermal disinfection system 20 includes a heating element 21, insulating layer 51, a hard protective case (proximal and distal portions) 53, a controller 31, such as a microcontroller, to regulate the heating, and supporting various electronic components. In an embodiment, the heating device 21 may be a flexible 12 volt, 33 watt (2.75 amp) self-adhesive heat tape. The adhesive backing of the heat tape ensures uniform contact with the cylindrical surface of the intermediate conduit 11 (e.g., tailpiece). An electronic temperature sensor device 41 may be attached to the outer surface of the intermediate conduit 11 (e.g., tailpiece) in the middle of the span of heating device (i.e., heat tape) along the longitudinal span of the intermediate conduit 11. The temperature sensor 41 provides real-time monitoring of the surface temperature of the intermediate conduit 11 (i.e., tailpiece) to the controller 31, such as a microcontroller system.

The flexible heat tape approach of the heating device 21 and the temperature sensor 41 may be insulated in various ways. In an embodiment, an example of the insulation may include a thin layer of Kapton polyimide tape that serves as an electrical insulator and further secures the heating tape and temperature sensor to the intermediate conduit 11 (e.g., tailpiece). A half-inch layer of fire-retardant silicone rubber foam insulation surrounds the Kapton polyimide tape to keep the heat localized around the surface of the intermediate conduit 11 (e.g., tailpiece) as well as to ensure the protective case, i.e., housing 53, remains cool to the touch, the adjacent electronics remain within their operating temperatures, and the conservation of energy. This embodiment assures that the heat is localized to the intermediate conduit 11, which provides for the effective heating and drying of the intermediate conduit 11.

In an embodiment, the hard outer case, housing 53, may be made of acrylonitrile butadiene styrene (ABS) plastic. The housing 53 (e.g., case) may be comprised of two separate parts that may slide over opposite ends of the intermediate conduit 11 (e.g., tailpiece) and fasten to one another. Once assembled, the housing 53 (e.g., case) may include two chambers or designated portions. The one chamber of the housing 53 (e.g., proximal portion of the chamber) has a central opening for the tailpiece and may house the heat tape, temperature sensor, and insulation. The second chamber of the housing 53 (e.g., distal portion of the chamber) may be adjacent to the first chamber and contains the other electronic components, including the controller 31 (e.g., microcontroller). There may be a small openings between the two chambers of the housing 53 through which the heat tape and temperature sensor lead wires (not shown in FIG. 11) can pass. The electronics chamber of the prototype thermal disinfection system 20 has an additional opening (not shown in FIG. 11) through which the USB port (not shown in FIG. 11) may be in communication with the controller and which can be accessed without disassembling the thermal disinfection system 20. This allows for monitoring and quick modification of the software of the thermal disinfection system 20. A prototype circuit board has been designed that fits into this electronics chamber or electronics board. Also, vents 4 may be provided, such as located on the surfaces of the chambers of the housing 53 to help keep the electronics cool (or other components).

In an embodiment, the prototype device is currently programmed to heat the tailpiece and maintain a temperature of 75° C. for one hour, per World Health Organization (WHO) guidelines for thermal disinfection, every four hours. [See 6] To successfully and effectively regulate the heating element, the controller 31 may be a proportional-integral-derivative (PID) controller that accepts a target temperature as an input, then automatically tracks the surface temperature of the intermediate conduit 11 (e.g., tail piece) using the temperature sensor 41 during a heating cycle and appropriately adjusts the electrical current applied to the heating element 21 (i.e., heating device) via a transistor 49, which may be configured to switch the current on and off for the heating device. An example transistor may be but not limited to a MOSFET. This feedback loop allows for careful control of the temperature of the tailpiece 11 and prevents the heating device 21 from overheating.

Still referring to FIGS. 11A-B, also housed within the electronics chamber or portion of the housing 53 is an visual indicator device 43, such as an external status LED 43 that protrudes through an aperture 48 of the housing 53 (e.g., outer case). The LED indicates the current functional and operational status of the heating device 21, as well as other components of the thermal disinfection system 20 and warns of elevated temperatures of the intermediate conduit 11 (e.g., tailpiece) for safety and other operational purposes. The controller 31 and related components may be designed wherein specified or predetermined temperatures sensed and respective colors to be indicated (or duration or intensity of light transmission) may be provided as desired or required. For example, at the start of each heating cycle, the LED will flash green (or designated color or frequency/pattern) for 10 seconds. While the intermediate conduit 11 (e.g., tailpiece) is heating up, the LED will illuminate turquoise (or designated color or frequency/pattern). The LED will remain turquoise unless the temperature sensor 41 detects a temperature of 85° C., well above what the PID controller should normally allow, in which case the LED will illuminate red (or designated color or frequency/pattern). When the tailpiece is cooling down after a normal heating cycle, the LED will illuminate blue (or designated color or frequency/pattern) when the tailpiece temperature is above 50° C. and green (or designated color or frequency/pattern) when the tailpiece temperature is below 50° C. The LED will remain green until the next heating cycle begins. If the device detects that an error has occurred, the LED may flash red, pink, or blue (or designated colors or frequencies/patterns).

Still referring to FIGS. 11A-B, a hardware or circuit failsafe may be included to ensure that the heating device 21 as well as other components of the thermal disinfection system 20 operate safely and for its intended operational parameters and characteristics. A thermal fuse 45 (e.g., thermal cutoff) may be provided in series in circuit (not shown in FIG. 11) with the heating device 21 (and/or the controller 31). The thermal fuse 45 (e.g., thermal cutoff) may make direct contact with the outer wall of the intermediate conduit 11 (e.g., tailpiece). If the temperature of the outer wall of the intermediate conduit 11 (e.g., tailpiece) exceeds 128° Celsius, the thermal fuse 45 (e.g., thermal cutoff) will irreversibly open the circuit, preventing current from flowing through the heating device 21. The controller 31 (e.g., microcontroller or PID) monitors the thermal fuse 45 (e.g., thermal cutoff); if the cutoff has been tripped, the external status as provided by the visual indicator device 43, such as the LED will flash red (or designated color or frequency/pattern) to indicate an error has occurred. A USB port (not shown in FIG. 11) or other type of port or connector may be connected or in communication with any computer, PDA, microprocessor device, display, or monitor (or storage device or computer medium) and the controller 31 may be configured to provide a message or other data or information that in turn may be displayed (or recorded or stored) indicating that the thermal cutoff has been tripped, as well as any other operational parameters and characteristics.

Still yet referring to FIGS. 11A-B, if the temperature of the intermediate conduit 11 (e.g., tailpiece) is elevated above 85° C., the controller 31 (such as a microcontroller) will trigger a forced cooldown phase where the intermediate conduit 11 (e.g., tailpiece) is allowed to cool back down to room temperature or other desired temperature level. The controller 31 may be set so that the LED will flash blue (or designated color or frequency/pattern) during this cooldown phase. The next heating cycle will begin on schedule, however if this forced cooldown phase is triggered in three consecutive cycles, the device will enter an idle phase where no heating will occur and the controller 31 will signal the LED to flash pink indefinitely (Alternatively, another indicator type may be provided to be used for signaling). A USB port (not shown in FIG. 11) or other type of port or connector may be connected or in communication with any computer, PDA, microprocessor device, display, or monitor (or storage device or computer medium) and the controller 31 may be configured to provide a message or other data or information that in turn may be displayed (or recorded or stored) indicating the heater is in an idle phase, as well as any other operational parameters and characteristics. A reset of the system may be accomplished by the commands/demands set forth by the microcontroller or by unplugging and plugging the power to system. The controller 31 (or components of the system discussed herein) may be in communication (locally and/or remotely) with any monitor, display or GUI of a computer, PDA, and/or microprocessor device. The controller 31 (or components of the system discussed herein) may be in communication (locally and/or remotely) with any computer, PDA, microprocessor device, and/or storage medium.

An embodiment of the device is powered using a 12 volt, 2.5 amp DC external power supply that connects via a standard barrel jack power lug 58 at the distal portion of the housing 53 (e.g., external case).

Example and Experimental Results Set No. 2

Sink Laboratory Testing

Figure 12:
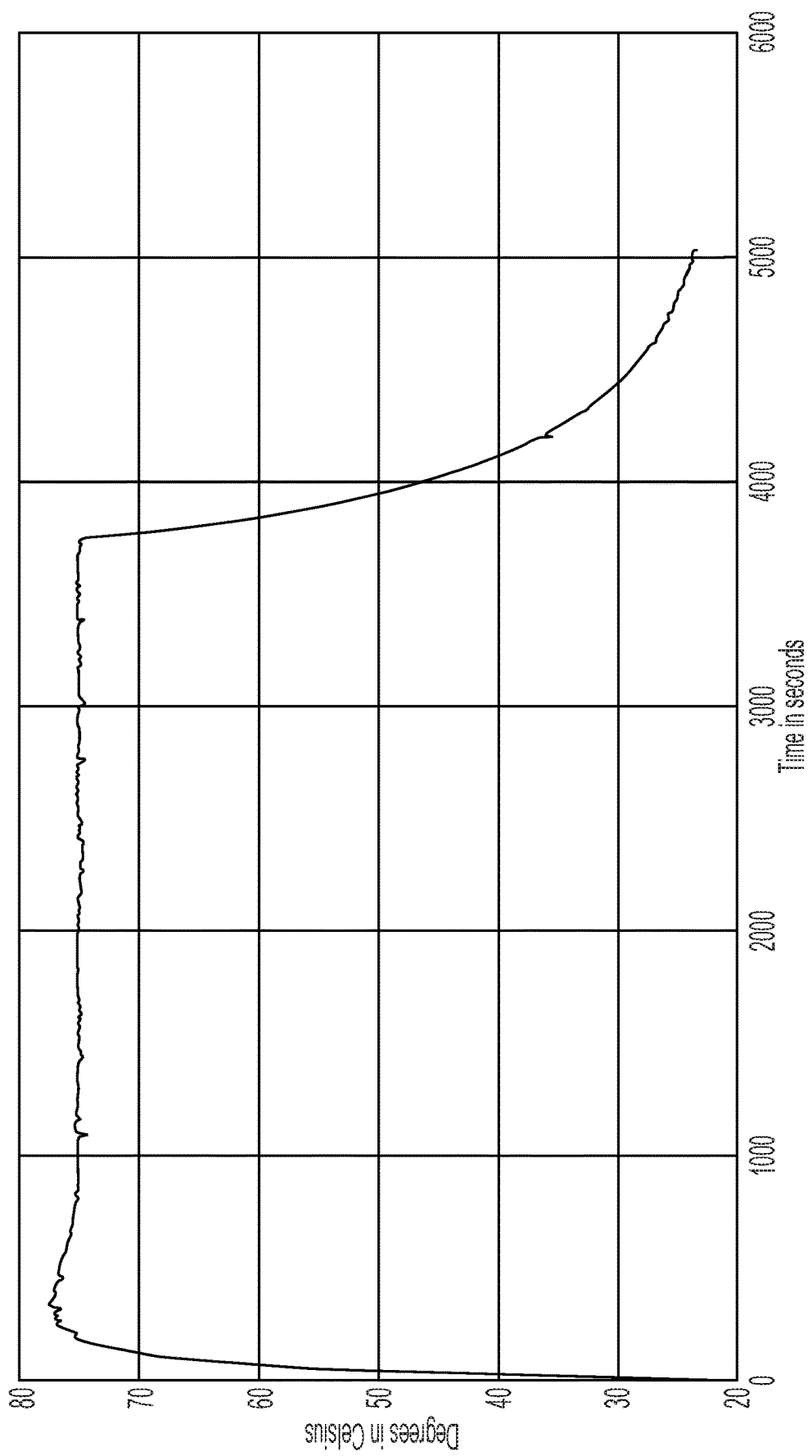
FIG. 12 graphically illustrates a heating curve associated with an embodiment of the thermal disinfection system having a PID controller of which demonstrates the PID controller's ability to reach and maintain a target temperature of 75° Celsius.

FIG. 12 graphically illustrates a heating curve associated with an embodiment of the thermal disinfection system having a PID controller of which demonstrates the PID controller's ability to reach and maintain a target temperature of 75° Celsius. Two tests were conducted to validate, among other things, the efficacy of the controller. The test was conducted with the controller provided as a proportional-integral-derivative (PID) controller. The present inventor demonstrated the PID controller's ability to reach and maintain the initial target temperature of 75° Celsius for sixty minutes (3,600 Seconds) with very little fluctuation (See the graph of FIG. 12). The present inventor also tested the response of the heating device to cold water flowing through the intermediate conduit (e.g., tailpiece)—a circumstance that would inevitably be experienced in a clinical setting. Three cold water flows, each lasting thirty seconds, were applied during the three distinct phases of a heating cycle: the heating phase, the plateau phase, and the cooling phase. The PID controller responded adequately to the temperature perturbations caused by the flow of cold water at each phase. The temperature drop-off was due to the heater being powered down.

In cases where the heating cycle is interrupted by cold water flow, the controller is configured to provide for an equivalent amount of time that is consequently added to the heating cycle to ensure complete disinfection.

During a typical heating cycle, the temperatures outside the insulating layer (or housing) and the exposed portions of the intermediate conduit (e.g., tailpiece) and connected proximal plumbing are well below scalding conditions. The hottest external locations during a heating cycle are on the intermediate conduit (e.g., tailpiece) directly above and below the location of the heating device, which are heated via conduction from the length of the intermediate conduit (e.g., tailpiece) inside the heating device. After forty-five minutes of heating, the temperature of the intermediate conduit (e.g., tailpiece) at the threads (not shown) connecting to the proximal conduit, reaches about 60° C., and the distal end of the intermediate conduit (e.g., tailpiece) near the distal conduit (e.g., p-trap) reaches approximately 54° C. Only prolonged contact with these exposed regions would cause first-degree burns, and these temperatures will be even lower when measured on an intermediate conduit (e.g., tailpiece) that is installed on a sink, rather than on a benchtop [See 7].

Example and Experimental Results Set No. 3

Sink Laboratory Testing

To simulate an event in which the heat tape, constituting the heating device, receives the maximum current from its power supply for an extended duration, a mock device without hardware fail safes was supplied with 12 volts and 2.5 amps. Two trials were conducted to measure the maximum temperatures reached on the inside wall of the intermediate conduit (e.g., tailpiece), and between the Kapton polyimide tape and the silicone foam insulation (constituting the thermal insulating layer), were 128.7° C. and 199.6° C., respectively. Despite these high temperatures, the protective outer case (i.e., housing) remained cool to the touch and experienced only minor melting of its innermost rim (which directly contacts the intermediate conduit (i.e., tailpiece)). These results indicate that even in the event of a worst-case device malfunction, the outer case (i.e., housing) will still be safe to touch and remain intact. The temperature of the exposed intermediate conduit (i.e., tailpiece) directly above and below the span of the heating device (i.e., heat tape) would likely be a scalding hazard. However, if a thermal fuse (e.g., thermal cutoff) is provided as part of the disinfection system then the aforementioned failure mode would be prevented from ever occurring.

Example and Experimental Results Set No. 4

Sink Laboratory Testing

A laboratory experiment using benign *E. coli* that expresses a green fluorescent protein (GFP) was conducted to test an earlier version of a prototype embodiment and its ability to prevent (e.g., suppress) or inhibit (e.g., reduce) biofilm growth. Five adjacent sinks (labeled sinks 1 through 5 sequentially) in a laboratory setting that were connected via a shared outflow pipe. The plumbing fixtures on sink numbers 2 and 4 were disassembled at tailpiece (i.e., intermediate conduit) and P-trap joint (i.e. distal conduit), and GFP *E. coli* was inoculated via injecting 10 ml culture into the p-trap water (i.e., distal conduit water). A heating device was installed on an intermediate conduit (i.e., tailpiece) underneath a proximal conduit's associated fixture (i.e., sink number 3) and was programmed to heat the intermediate conduit (i.e., tailpiece) to 75° C. for one hour and three hours off cycle (every four hours). For this laboratory experiment, sink number 5 served as an untreated control.

Prior to each trial, previous GFP *E. coli* biofilms were eliminated and each sink's distal conduit (i.e., p-trap), intermediate conduit (i.e., tailpiece), and proximal conduit (i.e., drain) were swabbed and cultured on agar plates to confirm the absence of GFP *E. coli*. All five sinks were covered with sterile plastic and left undisturbed for two weeks. At the end of each two-week trial, the five sinks were again swabbed and cultured to determine presence or absence of GFP *E. coli* at each plumbing location. After each of three independent trials, GFP *E. coli* were consistently present below the tailpiece heater in sink number 3 yet absent in the intermediate conduit (i.e., tailpiece) above the heating device and in the proximal conduit (i.e., drain). In contrast, GFP *E. coli* was detected in the intermediate conduit (i.e., tailpiece) and proximal conduit (i.e., drain) of the positive control sink (sink number 5) at the conclusion of the three trials. These observations suggest the heating device is effective at preventing (e.g., suppressing) or inhibiting (e.g., reducing) biofilm spread from p-traps to sink basins.

In summary, at the end of two-weeks GFP *E. coli* was detected in the distal conduit (i.e., p-trap) intermediate conduit (i.e., tailpiece) and proximal conduit (i.e., drain) of the positive control sink (sink number 5). In contrast GFP *E. coli* was detected only in the distal conduit (i.e., p-trap) of the test sink (sink number 3 with the heating device located on the tailpiece, i.e., intermediate conduit). GFP *E. coli* was also detected in distal conduit (i.e., p-trap) and intermediate conduit (i.e., tailpiece) of the other connected sinks (sink number 1, 2 and 4), suggesting sink-to-sink retrograde transmission via connected plumbing.

It may be noted that in a different experiment, the heating device was programmed to heat the intermediate conduit (i.e., tailpiece) to 65° C. for one hour every twelve hours. This heating cycle was found to be ineffective.

Example and Experimental Results Set No. 5

Figure 14:
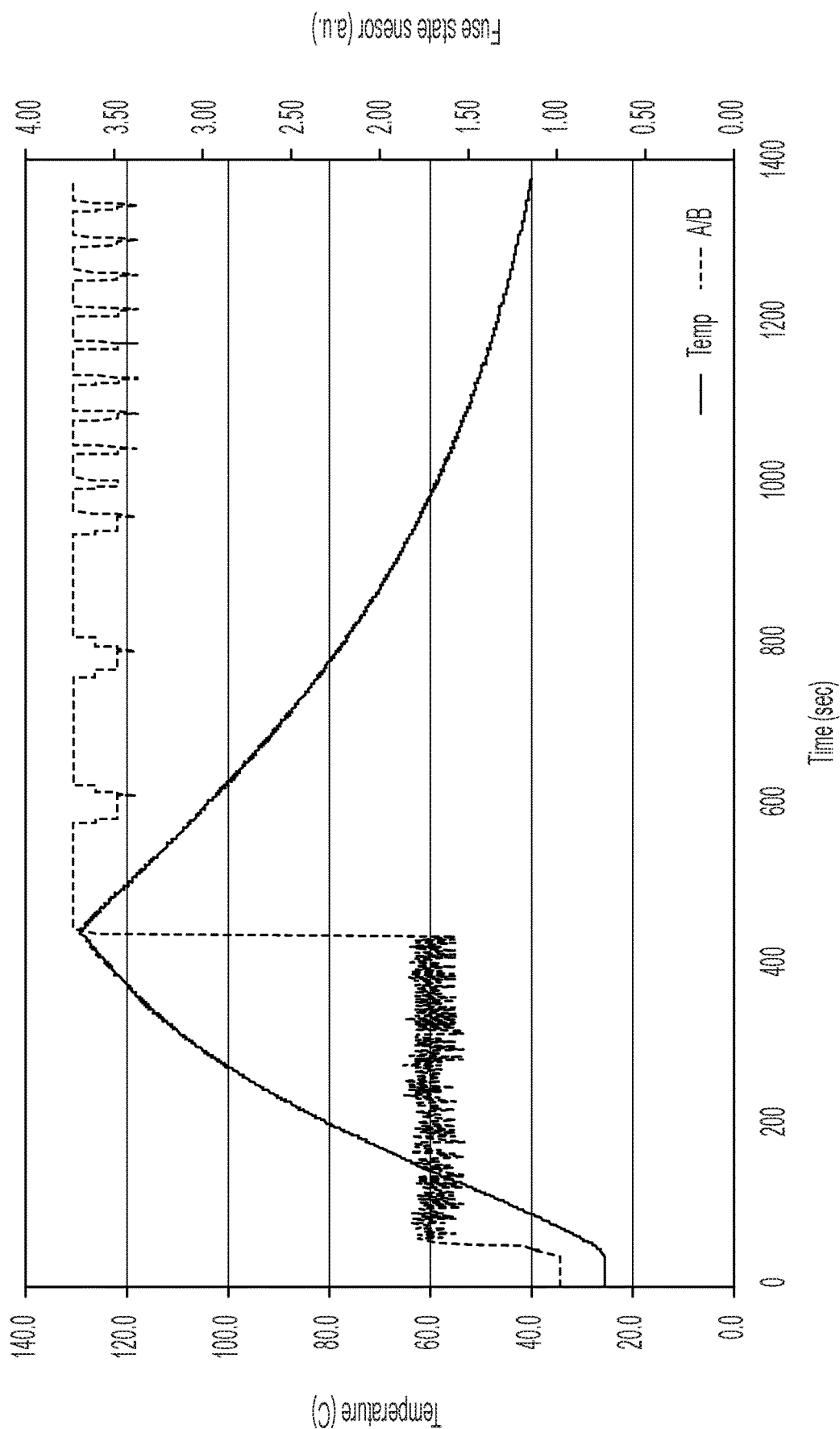
FIG. 14 graphically illustrates the status of the temperature and the fuse state sensor over a given time duration.

FIG. 14 graphically illustrates the status of the temperature (Celsius) and the fuse state sensor in arbitrary units (a.u.) over a given time duration (Seconds). In a safety test of an embodiment of the thermal disinfection system, the heater was programmed to heat in an uncontrolled manner. Temperature and the state of the thermal fuse were monitored. At 129° C. the thermal fuse opened, and the tailpiece (e.g., intermediate conduit) started cooling passively. The fuse state sensor captured the failure, allowing for visual or audible indications of the fault. "A/B" is the ratio of voltages measured above and below the thermal fuse. The ratio is low when the fuse is intact, and high when the fuse is open. Because it's a ratio of two voltages, the measure is dimensionless (i.e., "unitless"). For discussion purposes, the present inventor may refer "A/B" as "Sensor Value" or such other term as deemed appropriate.

Failure of the temperature sensor, a thermistor in a manifestation of the present experimental embodiment, could have any of three different results. Open-circuit failure, the most common, would result in an easily detected over-temperature reading. A short-circuit failure will result in an easily detected under-temperature reading. A parameter change failure may result in either a silent failure, or in over-heating. Overheating would be interrupted by the thermal fuse.

In the manifestation of the present experimental embodiment, the device is safe as built. At a steady-state tailpiece temperature of 75° C., the measured temperature on the case surface is 33° C. The temperature of the tailpiece two cm above the device, in an area generally inaccessible to casual contact, is 47° C., which is safe for brief contact. Two cm below the device the temperature is even lower, 38° C. Similarly, in an embodiment, the temperature of the tailpiece two cm above the device, in an area generally inaccessible to casual contact, is 62° C., which is safe for brief contact. Two cm below the device the temperature is even lower, 54° C. At the surface of the drain at the bottom of the basin, the temperature reaches only 40° C. In an embodiment, at the surface of the drain at the bottom of the basin, became dry.

Example and Experimental Results Set No. 6

See Mathers, A., et al., "Intensive Care Unit Wastewater Interventions to Prevent Transmission of Multi-species *Klebsiella pneumoniae* Carbapenemase (KPC) Producing Organisms", published online on Feb. 2, 2018; of which is hereby incorporated by reference herein in its entirety.

Example and Experimental Results Set No. 7

See Kotay, S., et al., "Spread from the Sink to the Patient: in situ Study Using Green Fluorescent Protein (GFP) Expressing-*Escherichia coli* to Model Bacterial Dispersion from Hand Washing Sink Trap Reservoirs", AEM accepted manuscript posted online 24 Feb. 2017, Appl. Environ. Microbiol. Doi: 10.1128/AEM.03327-16; of which is hereby incorporated by reference herein in its entirety.

Example and Experimental Results Set No. 8

Single-organism tests were run against *E. coli* (GFP). Further test runs (CRE) were against mixed community biofilms predominantly consisting of multidrug resistant strains of *Enterobacter cloacae, Pantoea species*, and *Kluyvera* species. For example, these were the species that the present inventor detected in this experiment using certain culture methods. That said, in this experiment the present inventor only screened for these group of bacteria (CRE) as they are of certain interest in accordance to the experiment. Without wishing to be bound by any particular theory for this experiment, it is hypothesized there were more species within the biofilms that the present inventor did not identify but apparently were also mitigated from growing in the tailpipe with the device installed (no growth).

ADDITIONAL EXAMPLES

Example 1. A thermal disinfection system for a liquid-carrying conduit in a plumbing system. The thermal disinfection system may comprise:
a heating device configured for thermal contact with at least a portion of said liquid-carrying conduit, thereby defining a thermal contact region of said liquid-carrying conduit; and
a thermal insulating layer disposed on said heating device configured to be located on a surface of said heating device opposite from said liquid-carrying conduit;
wherein said heating device is configured to heat a lumen defined by said liquid-carrying conduit along said thermal contact region to a specified temperature to prevent or inhibit microbial activity from advancing through said lumen defined by said liquid-carrying conduit.

Example 2. The system of example 1, wherein said microbial activity includes bacterial growth and colonization.

Example 3. The system of example 1 (as well as subject matter in whole or in part of example 2), wherein said heating device is further configured to:
dry said lumen defined by said liquid-carrying conduit along said thermal contact region to prevent or inhibit microbial activity through said lumen defined by said liquid carrying conduit.

Example 4. The system of example 3 (as well as subject matter in whole or in part of example 2), wherein said microbial activity includes bacterial growth and colonization.

Example 5. The system of example 1 (as well as subject matter of one or more of any combination of examples 2-4 in whole or in part), further comprising a controller in electrical communication by a circuit with said heating device to control at least one of duration of heat or magnitude of heat provided by said heating device.

Example 6. The system of example 5 (as well as subject matter of one or more of any combination of examples 2-4 in whole or in part), wherein the controlling the duration of heat includes providing the heat during intermittent time periods or specified time schedules.

Example 7. The system of example 5 (as well as subject matter of one or more of any combination of examples 2-6 in whole or in part), wherein the controlling magnitude of heat includes providing the heat at one or more temperatures or range of temperatures.

Example 8. The system of example 5 (as well as subject matter of one or more of any combination of examples 2-7 in whole or in part), wherein said controller is an analog or a digital type controller.

Example 9. The system of example 5 (as well as subject matter of one or more of any combination of examples 2-8 in whole or in part), wherein said controller comprises a processor or microcontroller.

Example 10. The system of example 5 (as well as subject matter of one or more of any combination of examples 2-9 in whole or in part), wherein said controller comprises a proportional-integral-derivative (PID) controller.

Without wishing to be bound by any limitations, heat may be controlled to reach a target temperature (or target temperatures). For instance, a PID controller is designed to accomplish such temperature control quickly (rapidly) yet stably.

Example 11. The system of example 1 (as well as subject matter of one or more of any combination of examples 2-10 in whole or in part), wherein said liquid-carrying conduit may comprise an intermediate conduit.

Example 12. The system of example 11, wherein said intermediate conduit is an intermediate pipe.

Example 13. The system of example 12, wherein intermediate pipe is a tailpiece.

Example 14. The system of example 11 (as well as subject matter of one or more of any combination of examples 2-13 in whole or in part), wherein said intermediate conduit comprises a thermally conductive material.

Example 15. The system of example 14 (as well as subject matter of one or more of any combination of examples 2-13 in whole or in part), wherein said thermally conductive material includes at least one or more of the following materials: brass, silver, copper, aluminum, stainless steel, or gold.

Example 16. The system of example 14 (as well as subject matter of one or more of any combination of examples 2-15 in whole or in part), wherein said thermally conductive material includes at least one type of a thermoplastic polymer.

Without wishing to be bound by any limitations, Polypropylene may be the material of choice for plastic tailpieces. Polypropylene (PP), also known as polypropene, is a thermoplastic polymer used in a wide variety of applications. Polypropylene is normally tough and flexible, especially when copolymerized with ethylene. This allows polypropylene to be used as an engineering plastic, competing with materials such as acrylonitrile butadiene styrene (ABS). Acrylonitrile butadiene styrene (ABS) (chemical formula $(C8H8)x \cdot (C4H6)y \cdot (C3H3N)z$) is a common thermoplastic polymer. Its glass transition temperature is approximately 105° C. (221° F.). ABS is amorphous and therefore has no true melting point.

Example 17. The system of example 11 (as well as subject matter of one or more of any combination of examples 2-16 in whole or in part), wherein said liquid-carrying conduit may comprise a proximal conduit.

Example 18. The system of example 17, wherein said proximal conduit is a drain pipe.

Example 19. The system of example 18, wherein said drain pipe is a fixture drain, strainer body, reservoir drain, or strainer sleeve.

Example 20. The system of example 17 (as well as subject matter of one or more of any combination of examples 2-19 in whole or in part), wherein said proximal conduit is in fluidic communication with a fixture.

Example 21. The system of example 20, wherein said fixture comprises at least one of the following: sink, tank, reservoir, tub, receptacle, shower or basin.

Example 22. The system of example 1 (as well as subject matter of one or more of any combination of examples 2-21 in whole or in part), wherein said liquid-carrying conduit may comprise a proximal conduit.

Example 23. The system of example 17 (as well as subject matter of one or more of any combination of examples 2-22 in whole or in part), wherein said liquid-carrying conduit may comprise a distal conduit.

Example 24. The system of example 23, wherein said distal conduit is a trap pipe.

Example 25. The system of example 24, wherein said trap pipe is a P-trap, S-trap, drum-trap, bottle-trap, or bell-trap.

Example 26. The system of example 23 (as well as subject matter of one or more of any combination of examples 2-25 in whole or in part), wherein said intermediate conduit is configured to be used with and between said proximal conduit and said distal conduit.

Example 27. The system of example 26 (as well as subject matter of one or more of any combination of examples 2-25 in whole or in part), wherein:

said intermediate conduit having an intermediate conduit inner lumen;

said proximal conduit having a proximal conduit inner lumen; and said distal conduit having distal conduit inner lumen.

Example 28. The system of example 1 (as well as subject matter of one or more of any combination of examples 2-27 in whole or in part), wherein said liquid-carrying conduit may comprise a distal conduit.

Example 29. The system of example 1 (as well as subject matter of one or more of any combination of examples 2-28 in whole or in part), wherein said heating device is configured to be attachable to said liquid-carrying conduit.

Example 30. The system of example 29, wherein said heating device is configured to be detachable from said liquid-carrying conduit.

Example 31. The system of example 29 (as well as subject matter of one or more of any combination of examples 2-30 in whole or in part), wherein thermal insulating layer is configured to be attachable to at least one or both of said liquid-carrying conduit and said heating device.

Example 32. The system of example 31 (as well as subject matter of one or more of any combination of examples 2-30 in whole or in part), wherein said thermal insulating layer is configured to be detachable from said at least one or both of said liquid-carrying conduit and said heating device.

Example 33. The system of example 1 (as well as subject matter of one or more of any combination of examples 2-32 in whole or in part), wherein said heating device is at least one or more of the following: induction heating device, radiant heating device, or convection heating device.

Example 34. The system of example 33, wherein said heating device is configured to be in direct contact with said liquid-carrying conduit at said thermal contact region.

Example 35. The system of example 1 (as well as subject matter of one or more of any combination of examples 2-34 in whole or in part), wherein said heating device is configured to be in direct contact with said liquid-carrying conduit at said thermal contact region.

Example 36. The system of example 1 (as well as subject matter of one or more of any combination of examples 2-35 in whole or in part), wherein said heating device is an electrical resistance heat type device.

Example 37. The system of example 36, wherein said electrical resistance heat device is configured to be in direct contact with said liquid-carrying conduit at said thermal contact region.

Example 38. The system of example 36 (as well as subject matter of one or more of any combination of examples 2-37 in whole or in part), wherein said electrical resistance heat device comprises any one or more of the following: heating wire, heating tape, thin-film heating element or polyimide film.

Example 39. The system of example 36 (as well as subject matter of one or more of any combination of examples 2-38 in whole or in part), wherein said electrical resistance heat device is coated with an electrical insulator.

Example 40. The system of example 36 (as well as subject matter of one or more of any combination of examples 2-39 in whole or in part), wherein said electrical resistance heating device is an extra low voltage device.

Example 41. The system of example 40, wherein said extra low voltage includes the range from about 10 volts to about 70 volts.

Example 42. The system of example 40 (as well as subject matter of one or more of any combination of examples 2-41 in whole or in part), wherein said extra low voltage includes one of the following: about 12 volts, about 24 volts, or about 48 volts.

Example 43. The system of example 40 (as well as subject matter of one or more of any combination of examples 2-42 in whole or in part), wherein said extra low voltage includes about one of the following voltages: 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, or 70.

Example 44. The system of example 1 (as well as subject matter of one or more of any combination of examples 2-43 in whole or in part), wherein said heating device is configured to be electrically connectable to a power supply.

Example 45. The system of example 44 (as well as subject matter of one or more of any combination of examples 2-43 in whole or in part), further comprising a kit that includes the power supply in electrical communication with said heating device for powering said heating device.

Example 46. The system of example 1 (as well as subject matter of one or more of any combination of examples 2-45 in whole or in part), wherein said heating device is configured to maintain the temperature of said lumen defined by said liquid-carrying conduit of said liquid-carrying conduit aligned with the thermal contact region at about 75 degree Celsius.

Example 47. The system of example 1 (as well as subject matter of one or more of any combination of examples 2-46 in whole or in part), wherein said heating device is configured to maintain the temperature of said lumen defined by said liquid-carrying conduit of said liquid-carrying conduit aligned with the thermal contact region at one of the following temperatures:
  about 65 degree Celsius;
  about 70 degree Celsius;
  about 80 degree Celsius;
  about 85 degree Celsius;
  about 90 degree Celsius; or
  about 95 degree Celsius.

Example 48. The system of example 1 (as well as subject matter of one or more of any combination of examples 2-47 in whole or in part), wherein said heating device is configured to maintain the temperature of said lumen defined by said liquid-carrying conduit of said liquid-carrying conduit aligned with the thermal contact region at about at least one of the following in degree Celsius: 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, or 99.

Example 49. The system of example 1 (as well as subject matter of one or more of any combination of examples 2-48 in whole or in part), further comprising a temperature sensor device disposed at the thermal contact region for determining temperature of said liquid-carrying conduit at the thermal contact region.

Example 50. The system of example 49, further comprising a visual indicator device in electrical communication by a circuit with said temperature sensor device configured to produce a specified characteristic of light signal for one or more operational characteristics of the system.

Example 51. The system of example 50, wherein said operational characteristics include at least one of the following:
  one or more specified temperatures at said thermal contact region;
  specified status of a power supply, which is configured to be in electrical communication with said heating device; or
  specified status of a thermal fuse or cutoff device, which is configured to be in electrical communication with said heating device.

Example 52. The system of example 50 (as well as subject matter of one or more of any combination of examples 2-49 in whole or in part), wherein said visual indicator device is a light emitting diode (LED).

Example 53. The system of example 49 (as well as subject matter of one or more of any combination of examples 2-52 in whole or in part), further comprising an audible indicator device in electrical communication by a circuit with said temperature sensor device configured to produce a specified characteristic of audio signal for one or more operational characteristics of the system.

Example 54. The system of example 53, wherein said operational characteristics include at least one of the following:
  one or more specified temperatures at said thermal contact region;
  specified status of a power supply, which is configured to be in electrical communication with said heating device; or
  specified status of a thermal fuse or cutoff device, which is configured to be in electrical communication with said heating device.

Example 55. The system of example 53 (as well as subject matter of one or more of any combination of examples 2-54 in whole or in part), wherein said audio indicator device is a speaker.

Without wishing to be bound by any limitations, an aspect of various embodiments may provide, but not limited thereto, the following:
  Specified temperature: could include predetermined or specified over-temperature, respectively, at the thermal contact region;
  Temperature: could include predetermined or specified under-temperature, respectively, at the thermal contact region. For example, that's effectively around 60 C. We know it's only partially effective at that temperature; and
  Specified power supply: status of power failure.

Without wishing to be bound by any limitations, an aspect of various embodiments may provide, but not limited thereto, the following:
  "system characteristics" could include device age of any elements recited in the example;
  alternatively, the visual or audio indicator may be (instead of or in addition to) "data output" so as to be in communication with a storage medium or other output device (located locally or remotely) to convey related system or status information; and
  alternatively, the visual or audio indicator may be a "vibrational alarm or device (placed or located appropriately for safety from excessive temperature) to provide the feedback such as with vibrations to convey related system or status information.

Example 56. The system of example 1 (as well as subject matter of one or more of any combination of examples 2-55 in whole or in part), further comprising a thermal fuse, in electrical communication by a circuit with said heating device and disposed in contact with said thermal contact region of said intermediate conduit, wherein at a specified temperature that which said thermal fuse is subjected, said thermal fuse and circuit is configured to cut off energy supplied to said heating device.

Example 57. The system of example 56, comprising a kit that includes a power supply, which is configured to be in electrical communication with said heating device for supplying the energy to said heating device.

Example 58. The system of example 56 (as well as subject matter of one or more of any combination of examples 2-57 in whole or in part), wherein said circuit in electrical communication with said thermal fuse is configured to detect a fault in said thermal fuse.

Example 59. The system of example 1 (as well as subject matter of one or more of any combination of examples 2-58 in whole or in part), further comprising one or more housings configured to enclose or retain said heating device.

Example 60. The system of example 59, wherein said one or more housings are configured to enclose or retain said thermal insulator layer.

Example 61. The system of example 60, wherein said one or more housings are configured to enclose a thermal fuse.

Example 62. The system of example 61, wherein said one or more housing are configured to enclose or retain a temperature sensor device.

Example 63. The system of example 59 (as well as subject matter of one or more of any combination of examples 2-62 in whole or in part), wherein said one or more housing are configured to enclose or retain a temperature sensor device.

Example 64. The system of example 63, wherein said one or more housings are configured to enclose or retain said thermal insulator layer.

Example 65. The system of example 64, wherein said one or more housings are configured to enclose or retain at least one or more of the following: a thermal fuse, a visual indicator device, an audio indicator, a circuit, a cutoff fault circuit, a controller, control board, circuit board, and a processor.

Example 66. The system of example 59 (as well as subject matter of one or more of any combination of examples 2-65 in whole or in part), wherein said one or more housings are configured to enclose or retain at least one or more of the following: a thermal fuse, a visual indicator device, an audio indicator device, a circuit, a cutoff fault circuit, a controller, control board, circuit board, and a processor.

Example 67. The system of anyone of examples 2 or 4 (as well as subject matter of one or more of any combination of examples 3 or 5-66 in whole or in part), wherein said bacterial growth and colonization comprises at least one or more of any combination of the following types of bacteria: *Escherichia coli* (*E. coli*), *Enterobacter cloacae*, *Pantoea*, *Klebsiella pneumoniae*, and *Kluyvera*.

Example 68. The system of anyone of examples 29, 30, 34, 36, 46, 47, or 49 (as well as subject matter of one or more of any combination of examples 2-67 in whole or in part), wherein said liquid-carrying conduit may comprise an intermediate conduit.

Example 69. The system of any one of example 1 or 2 (as well as subject matter of one or more of any combination of examples 3-68 in whole or in part), wherein said liquid-carrying conduit may comprise a proximal conduit.

70. The system of example 69 (as well as subject matter of one or more of any combination of examples 2-68 in whole or in part), wherein said heating device is configured to maintain the temperature of said proximal conduit at one or more of the following temperatures or ranges of temperatures in degree Celsius: about 40; about 47; about 50; about 54; about 40-49; or about 50-59. Moreover, in an embodiment, said heating device is configured to maintain the temperature of said proximal conduit at about one or more of the following temperatures in degree Celsius: 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, or 70.

Example 71. The system of anyone of example 1 or 2 (as well as subject matter of one or more of any combination of examples 3-70 in whole or in part), wherein said liquid-carrying conduit may comprise a distal conduit.

Example 72. A method for disinfecting a liquid-carrying conduit in a plumbing system. The method may comprise:

heating at least a portion of said liquid-carrying conduit, thereby defining a thermal contact region of said liquid-carrying conduit; and insulating said heating device opposite from said liquid-carrying conduit;

wherein said heating dis configured to heat a lumen defined by said liquid-carrying conduit along said thermal contact region to a specified temperature to prevent or inhibit microbial activity from advancing through said lumen defined by said liquid-carrying conduit.

Example 73. The method of example 72, wherein said microbial activity includes bacterial growth and colonization.

Example 74. The method of example 72 (as well as subject matter in whole or in part of example 73), wherein said method further comprises:

drying said lumen defined by said liquid-carrying conduit along said thermal contact region to prevent or inhibit microbial activity through said lumen defined by said liquid carrying conduit.

Example 75. The method of using any of the systems (structures or devices, or material) or its components or sub-components provided in any one or more of examples 1-71, in whole or in part.

Example 76. The method of manufacturing any of the systems (structures or devices, or material) or its components or sub-components provided in any one or more of examples 1-71, in whole or in part.

Example 77. A non-transitory machine readable medium including instructions for disinfecting a liquid-carrying conduit in a plumbing system, which when executed by a machine, cause the machine to perform any of the steps or activities provided in any one or more of examples 72-74.

REFERENCES

The following patents, applications and publications as listed below and throughout this document are hereby incorporated by reference in their entirety herein, and which are not admitted to be prior art with respect to the present invention by inclusion in this section:

1. Leitner, E. et al. Contaminated handwashing sinks as the source of a clonal outbreak of KPC-2-producing *Klebsiella oxytoca* on a hematology ward. *Antimicrob. Agents Chemother.* 59, 714-716 (2015).
2. Kotsanas, D. et al. 'Down the drain': carbapenem-resistant bacteria in intensive care unit patients and handwashing sinks. *Med. J. Aust.* 198, 267-269 (2013).
3. Tofteland, S., Naseer, U., Lislevand, J. H., Sundsfjord, A. & Samuelsen, Ø. A Long-Term Low-Frequency Hospital Outbreak of KPC-Producing *Klebsiella pneumoniae* Involving Intergenus Plasmid Diffusion and a Persisting Environmental Reservoir. *PLoS ONE* 8, (2013).
4. Lowe, C. et al. Outbreak of Extended-Spectrum B-Lactamase-producing *Klebsiella oxytoca* Infections Associated with Contaminated Handwashing Sinks. *Emerg. Infect. Dis.* 18, 1242-1247 (2012).
5. *Antibiotic Resistance Threats in the United States,* 2013. (Centers for Disease Control and Prevention, 2013).
6. Practical Guidelines for Infection Control in Health Care Facilities. (2004).
7. Moritz, A. R. & Henriques, F. C. Studies of Thermal Injury. *Am. J. Pathol.* 23, 695-720 (1947).
8. Spellberg, B., Powers, J. H., Brass, E. P., Miller, L. G. & Edwards, J. E. Trends in antimicrobial drug development: implications for the future. *Clin. Infect. Dis. Off Publ. Infect. Dis. Soc. Am.* 38, 1279-1286 (2004).

9. Smith Moland, E. et al. Plasmid-mediated, carbapenem-hydrolysing beta-lactamase, KPC-2, in *Klebsiella pneumoniae* isolates. *J. Antimicrob. Chemother.* 51, 711-714 (2003).
10. Buntin, J. Outbreak at NIH. *Washingtonian* (2013). Available at: http://www.washingtonian.com/articles/people/outbreak-at-nih/. (Accessed: 15th October 2015)
11. Melville, N. A. Contaminated Sink Drains Linked to ICU Infection Outbreaks. *Medscape* (2014). Available at: http://www.medscape.com/viewarticle/835925. (Accessed: 15 Oct. 2015)
12. Wilmer, C. G. Drain trap cleaning device. (1948).
13. Eloranta, K., Lindroos, R. & Surakka, J. Drain pipe sterilization. (1976).
14. Pederson Jr., P. D., Ufford, K. A. & Nelson, L. V. Electrically heated thermal microbial drain barrier. (1980).
15. Gemmell, L. W. & AU. U.S. Pat. No. 4,502,164—Device for destroying bacterial flora. (1985).
16. Cruz, L. U.S. Pat. No. 5,940,894—Sanitizing protector for drainage pipes. (1999).
17. Schluttig, A. & DE. U.S. Pat. No. 6,666,966—Self-disinfecting drain trap in drainage channels. (2003).
18. Halpern, N. A. & Pastores, S. M. Critical care medicine in the United States 2000-2005: an analysis of bed numbers, occupancy rates, payer mix, and costs. *Crit. Care Med.* 38, 65-71 (2010).
19. Tracking CRE|HAI|CDC. Available at: http://www.cdc.gov/hai/organisms/cre/TrackingCRE.html. (Accessed: 24th May 20
20. U.S. Pat. No. 2,452,367, Gangloff, W. C., "Drain Trap Cleaning Device, Oct. 26, 1948.
21. Prevention of Infectious Aerosols in Hospitals by BIOREC—Infectious aerosols from sink drains, BIOREC, Dr. Schluttig, Available at: http://biorec.de/en/?The_Selfdisinfecting_Syphon_BIOREC.
22. The Technical Solution of the Problem by BIOREC—Dr. Schluttig, Available at: http://biorec.de/en/?The_Selfdisinfecting_Syphon_BIOREC:The_Technical_Background
23. U.S. Pat. No. 3,985,994, Eloranta, et al., "Drain Pipe Sterilization", Oct. 12, 1976.
24. U.S. Pat. No. 4,192,988, Pederson, Jr., et al., "Electrically Heated Thermal Microbial Drain Barrier", Mar. 11, 1980.

ADDITIONAL REFERENCES

The devices, systems, apparatuses, compositions, materials, machine readable medium, computer program products, and methods of various embodiments of the invention disclosed herein may utilize aspects disclosed in the following references, applications, publications and patents and which are hereby incorporated by reference herein in their entirety, and which are not admitted to be prior art with respect to the present invention by inclusion in this section:

A. Japanese Patent Application Publication No. JP2001340844 (A), Sato Susumu, "Method and Apparatus for Sterilizing Wastewater Containing Microorganism and/or Virus", Dec. 11, 2001.
B. Korean Patent Application Publication No. KR20110092376 (A), Jung Woog Byun, "Automatic Drying Function Occurs through the Suppression of Bacteria and Odor with a Sink", Aug. 18, 2011.
C. Japanese Patent Application Publication No. JP2008007978A, Takashi, et al., "Drain Trap", Jan. 17, 2008.
D. Mathers, A., et al., "Intensive Care Unit Wastewater Interventions to Prevent Transmission of Multi-species *Klebsiella pneumoniae* Carbapenemase (KPC) Producing Organisms", published online on Feb. 2, 2018.
E. Japanese Patent Application Publication No. JP2002309643 (A), Yorisuke, et al., "Heating-Type Bacteria Blocking Drainage Trap", Oct. 23, 2002.
F. German Patent Application Publication No. DE4206901 (A1), Essler, K., "Disinfection of water in U=Bends, e.g., in Wash-Basin Outlets—by Provising Germ-Killing Zone Contg. Heating Elements, Electrolytic Cell or UV-Light Source Within U=Bend", Sep. 9, 1993.
G. U.S. Pat. No. 5,039,135, Palmer, R., "Drain Trap with Ice Plug Prevention", Aug. 13, 1991.
H. GB Patent Application Publication No. 1417711, Hastings, et al., "A Waste Trap and a Washing Installation", Dec. 17, 1975.
I. U.S. Patent Application Publication No. US 2011/0162824 A1, Farrell, C., "Heat Recovery Apparatus", Jul. 7, 2011.
J. U.S. Pat. No. 5,079,784, Rist, et al., "Hydro-Massage Tub Control System", Jan. 14, 1992.
K. U.S. Pat. No. 2,736,038, Mansfield, R., "Foot Treating Vessel", Feb. 28, 1956.
L. European Patent No. EP0338056 B1, Bechem, et al., "Apparatus for Prevention of the Occurrence or Proliferation of Microorganisms in Water for Industrial Use", Jan. 26, 1994.
M. U.S. Patent Application Publication No. US 2007/0280649 A1, Korstanje, J., "Water Supply System Arranged for Killing Pathogens, Operating Device and Method for Killing Pathogens in a Water Supply System", Dec. 6, 2007.
N. Perryman, F., et al., "Prevalence of Gentamicin-and Amikacin-Resistant Bacteria in Sink Drains", Journal of Clinical Microbiology", July 1980, Vol. 12, No. 1, p. 79-83.
O. Table 1, "Summary of environmental locations surveyed and $^{bla}$KPC/$^{bla}$NDM-positive organisms identified between January 2012 and December 2016", PubMed Central, mBio. 2018 January-February; 9(1): e02011-17, Published online 2018 Feb. 6: 10.1128/mBio.02011-17. https://www.ncbi.nim.nih.gov/PMC 5801463/table/tab 1/.
P. Lalancette, C., et al., "Hospital Drains as Reservoirs of *Pseudomonas aeruginosa*: Multiple-Locus Variable-Number of Tandem Repeats Analysis Genotypes Recovered from Faucets, Sink Surfaces and Patients", Pathogens 2017, 6, 36, p. 1-12.
Q. Kotay, S., et al., "Spread from the Sink to the Patient: in situ Study Using Green Fluorescent Protein (GFP) Expressing-*Escherichia coli* to Model Bacterial Dispersion from Hand Washing Sink Trap Reservoirs", AEM accepted Manuscript Posted Online 24 Feb. 2017, Appl. Environ. Microbiol. Doi: 10.1128/AEM.03327-16.

Unless clearly specified to the contrary, there is no requirement for any particular described or illustrated activity or element, any particular sequence or such activities, any particular size, speed, material, duration, contour, dimension or frequency, or any particularly interrelationship of such elements. Moreover, any activity can be repeated, any activity can be performed by multiple entities, and/or any element can be duplicated. Further, any activity or element can be excluded, the sequence of activities can vary, and/or the interrelationship of elements can vary. It should be appreciated that aspects of the present invention may have a variety of sizes, contours, shapes, compositions and materials as desired or required.

In summary, while the present invention has been described with respect to specific embodiments, many modifications, variations, alterations, substitutions, and equivalents will be apparent to those skilled in the art. The present invention is not to be limited in scope by the specific embodiment described herein. Indeed, various modifications of the present invention, in addition to those described herein, will be apparent to those of skill in the art from the foregoing description and accompanying drawings. Accordingly, the invention is to be considered as limited only by the spirit and scope of the following claims, including all modifications and equivalents.

Still other embodiments will become readily apparent to those skilled in this art from reading the above-recited detailed description and drawings of certain exemplary embodiments. It should be understood that numerous variations, modifications, and additional embodiments are possible, and accordingly, all such variations, modifications, and embodiments are to be regarded as being within the spirit and scope of this application. For example, regardless of the content of any portion (e.g., title, field, background, summary, abstract, drawing figure, etc.) of this application, unless clearly specified to the contrary, there is no requirement for the inclusion in any claim herein or of any application claiming priority hereto of any particular described or illustrated activity or element, any particular sequence of such activities, or any particular interrelationship of such elements. Moreover, any activity can be repeated, any activity can be performed by multiple entities, and/or any element can be duplicated. Further, any activity or element can be excluded, the sequence of activities can vary, and/or the interrelationship of elements can vary. Unless clearly specified to the contrary, there is no requirement for any particular described or illustrated activity or element, any particular sequence or such activities, any particular size, speed, material, dimension or frequency, or any particularly interrelationship of such elements. Accordingly, the descriptions and drawings are to be regarded as illustrative in nature, and not as restrictive. Moreover, when any number or range is described herein, unless clearly stated otherwise, that number or range is approximate. When any range is described herein, unless clearly stated otherwise, that range includes all values therein and all sub ranges therein. Any information in any material (e.g., a United States/foreign patent, United States/foreign patent application, book, article, etc.) that has been incorporated by reference herein, is only incorporated by reference to the extent that no conflict exists between such information and the other statements and drawings set forth herein. In the event of such conflict, including a conflict that would render invalid any claim herein or seeking priority hereto, then any such conflicting information in such incorporated by reference material is specifically not incorporated by reference herein.

We claim:

1. A thermal disinfection system for a liquid-carrying conduit in a plumbing system, the thermal disinfection system comprising:
   a heating device configured for thermal contact with at least a portion of said liquid-carrying conduit, thereby defining a thermal contact region of said liquid-carrying conduit, wherein said liquid-carrying conduit comprises thermally conductive material or non-heat-resistant material;
   a thermal insulating layer disposed on said heating device configured to be located on a surface of said heating device opposite from said liquid-carrying conduit; and
   wherein said heating device is configured to heat and dry a lumen defined by said liquid-carrying conduit along said thermal contact region to a specified temperature to prevent or inhibit microbial activity from advancing through said lumen defined by said liquid-carrying conduit.

2. The system of claim 1, wherein said microbial activity includes bacterial growth and colonization.

3. The system of claim 1, further comprising a controller in electrical communication by a circuit with said heating device to control at least one of duration of heat or magnitude of heat provided by said heating device.

4. The system of claim 3, wherein the controlling the duration of heat includes providing the heat during intermittent time periods or specified time schedules.

5. The system of claim 3, wherein the controlling magnitude of heat includes providing the heat at one or more temperatures or range of temperatures.

6. The system of claim 1, wherein said liquid-carrying conduit may comprise an intermediate conduit.

7. The system of claim 6, wherein said intermediate conduit is an intermediate pipe.

8. The system of claim 7, wherein intermediate pipe is a tailpiece.

9. The system of claim 6, wherein said liquid-carrying conduit may comprise a proximal conduit.

10. The system of claim 9, wherein said proximal conduit is a drain pipe.

11. The system of claim 10, wherein said drain pipe is a fixture drain, strainer body, reservoir drain, or strainer sleeve.

12. The system of claim 9, wherein said proximal conduit is in fluidic communication with a fixture.

13. The system of claim 12, wherein said fixture comprises at least one of the following: sink, tank, reservoir, tub, receptacle, shower or basin.

14. The system of claim 1, wherein said liquid-carrying conduit may comprise a proximal conduit.

15. The system of claim 9, wherein said liquid-carrying conduit may comprise a distal conduit.

16. The system of claim 15, wherein said distal conduit is a trap pipe.

17. The system of claim 16, wherein said trap pipe is a P-trap, S-trap, drum-trap, bottle-trap, or bell-trap.

18. The system of claim 15, wherein said intermediate conduit is configured to be used with and between said proximal conduit and said distal conduit.

19. The system of claim 1, wherein said liquid-carrying conduit may comprise a distal conduit.

20. The system of claim 1, wherein said heating device is configured to be:
   attachable to said liquid-carrying conduit;
   detachable from said liquid-carrying conduit; or
   attachable and detachable from said liquid-carrying conduit.

21. The system of claim 20, wherein thermal insulating layer is configured to be:
   attachable to at least one or both of said liquid-carrying conduit and said heating device;
   detachable from said at least one or both of said liquid-carrying conduit and said heating device; or
   attachable and detachable from said at least one or both of said liquid-carrying conduit and said heating device.

22. The system of claim 1, wherein said heating device is at least one or more of the following: induction heating device, radiant heating device, or convection heating device.

23. The system of claim 22, wherein said heating device is configured to be in direct contact with said liquid-carrying conduit at said thermal contact region.

24. The system of claim 1, wherein said heating device is an electrical resistance heat type device.

25. The system of claim 24, wherein said electrical resistance heat device is configured to be in direct contact with said liquid-carrying conduit at said thermal contact region.

26. The system of claim 24, wherein said electrical resistance heat device comprises any one or more of the following: heating wire, heating tape, thin-film heating element or polyimide film.

27. The system of claim 24, wherein said electrical resistance heating device is an extra low voltage device.

28. The system of claim 27, wherein said extra low voltage includes the range from about 10 volts to about 70 volts.

29. The system of claim 27, wherein said extra low voltage includes one of the following: about 12 volts, about 24 volts, or about 48 volts.

30. The system of claim 1, wherein said heating device is configured to be electrically connectable to a power supply.

31. The system of claim 1, wherein said heating device is configured to maintain the temperature of said lumen defined by said liquid-carrying conduit of said liquid-carrying conduit aligned with the thermal contact region at about 75 degree Celsius.

32. The system of claim 1, wherein said heating device is configured to maintain the temperature of said lumen defined by said liquid-carrying conduit of said liquid-carrying conduit aligned with the thermal contact region at one of the following temperatures:
about 65 degree Celsius;
about 70 degree Celsius;
about 80 degree Celsius;
about 85 degree Celsius;
about 90 degree Celsius; or
about 95 degree Celsius.

33. The system of claim 1, further comprising a temperature sensor device disposed at the thermal contact region for determining temperature of said liquid-carrying conduit at the thermal contact region.

34. The system of claim 33, further comprising a visual indicator device in electrical communication by a circuit with said temperature sensor device configured to produce a specified characteristic of light signal for one or more operational characteristics of the system.

35. The system of claim 34, wherein said operational characteristics include at least one of the following:
one or more specified temperatures at said thermal contact region;
specified status of a power supply, which is configured to be in electrical communication with said heating device; or
specified status of a thermal fuse or cutoff device, which is configured to be in electrical communication with said heating device.

36. The system of claim 34, wherein said visual indicator device is a light emitting diode (LED).

37. The system of claim 33, further comprising an audible indicator device in electrical communication by a circuit with said temperature sensor device configured to produce a specified characteristic of audio signal for one or more operational characteristics of the system.

38. The system of claim 37, wherein said operational characteristics include at least one of the following:
one or more specified temperatures at said thermal contact region;
specified status of a power supply, which is configured to be in electrical communication with said heating device; or
specified status of a thermal fuse or cutoff device, which is configured to be in electrical communication with said heating device.

39. The system of claim 37, wherein said audio indicator device is a speaker.

40. The system of claim 1, further comprising a thermal fuse, in electrical communication by a circuit with said heating device and disposed in contact with said thermal contact region of said intermediate conduit, wherein at a specified temperature that which said thermal fuse is subjected, said thermal fuse and circuit is configured to cut off energy supplied to said heating device.

41. The system of claim 40, wherein said circuit in electrical communication with said thermal fuse is configured to detect a fault in said thermal fuse.

42. The system of claim 1, further comprising one or more housings configured to enclose or retain said heating device.

43. The system of claim 42, wherein said one or more housings are configured to enclose or retain said thermal insulating layer.

44. The system of claim 43, wherein said one or more housing are configured to enclose or retain a temperature sensor device.

45. The system of claim 44, wherein said one or more housings are configured to enclose or retain said thermal insulating layer.

46. The system of claim 45, wherein said one or more housings are configured to enclose or retain at least one or more of the following: a thermal fuse, a visual indicator device, an audio indicator, a circuit, a cutoff fault circuit, a controller, control board, circuit board, and a processor.

47. The system of claim 2, wherein said bacterial growth and colonization comprises at least one or more of any combination of the following types of bacteria:
*Escherichia coli* (*E. coli*), *Enterobacter cloacae*, *Pantoea*, *Klebsiella pneumoniae*, and *Kluyvera*.

48. The system of claim 20, wherein said liquid-carrying conduit may comprise an intermediate conduit.

49. The system of claim 33, wherein said liquid-carrying conduit may comprise a proximal conduit.

50. The system of claim 49, wherein said heating device is configured to maintain the temperature of said proximal conduit at one or more of the following temperatures or ranges of temperatures in degree Celsius:
about 40;
about 47;
about 50;
about 54;
about 40-49; or
about 50-59.

51. The system of claim 33, wherein said liquid-carrying conduit may comprise a distal conduit.

52. The system of claim 23, wherein said liquid-carrying conduit may comprise an intermediate conduit.

53. The system of claim 31, wherein said liquid-carrying conduit may comprise an intermediate conduit.

54. The system of claim 32, wherein said liquid-carrying conduit may comprise an intermediate conduit.

55. The system of claim 33, wherein said liquid-carrying conduit may comprise an intermediate conduit.

56. The system of claim 2, wherein said liquid-carrying conduit may comprise a proximal conduit.

57. The system of claim 2, wherein said liquid-carrying conduit may comprise a distal conduit.

58. The system of claim 1, wherein said thermally conductive material or non-heat-resistant material includes at least one or more of the following materials: brass, silver, copper, aluminum, stainless steel, or gold.

59. A thermal disinfection system configured for use with a liquid-carrying conduit existing in place (i.e., in situ) in a plumbing system existing in place (i.e., in situ), the thermal disinfection system comprising:
- a heating device configured for thermal contact with at least a portion of said liquid-carrying conduit, thereby defining a thermal contact region of said liquid-carrying conduit;
- a thermal insulating layer disposed on said heating device configured to be located on a surface of said heating device opposite from said liquid-carrying conduit;
- wherein said thermal disinfection system is configured to be installed in the field on said liquid-carrying conduit that is existing in place (i.e., in situ) in said plumbing system that is existing in place (i.e., in situ); and
- wherein said heating device is configured to heat and dry a lumen defined by said liquid-carrying conduit along said thermal contact region to a specified temperature to prevent or inhibit microbial activity from advancing through said lumen defined by said liquid-carrying conduit.

60. The system of claim 59, wherein said microbial activity includes bacterial growth and colonization.

61. The system of claim 59, further comprising a controller in electrical communication by a circuit with said heating device to control at least one of duration of heat or magnitude of heat provided by said heating device.

62. The system of claim 61, wherein the controlling the duration of heat includes providing the heat during intermittent time periods or specified time schedules.

63. The system of claim 61, wherein the controlling magnitude of heat includes providing the heat at one or more temperatures or range of temperatures.

64. The system of claim 59, wherein said liquid-carrying conduit may comprise an intermediate conduit.

65. The system of claim 64, wherein said intermediate conduit is an intermediate pipe.

66. The system of claim 65, wherein intermediate pipe is a tailpiece.

67. The system of claim 64, wherein said liquid-carrying conduit may comprise a proximal conduit.

68. The system of claim 67, wherein said proximal conduit is a drain pipe.

69. The system of claim 68, wherein said drain pipe is a fixture drain, strainer body, reservoir drain, or strainer sleeve.

70. The system of claim 67, wherein said proximal conduit is in fluidic communication with a fixture.

71. The system of claim 70, wherein said fixture comprises at least one of the following: sink, tank, reservoir, tub, receptacle, shower or basin.

72. The system of claim 59, wherein said liquid-carrying conduit may comprise a proximal conduit.

73. The system of claim 67, wherein said liquid-carrying conduit may comprise a distal conduit.

74. The system of claim 73, wherein said distal conduit is a trap pipe.

75. The system of claim 74, wherein said trap pipe is a P-trap, S-trap, drum-trap, bottle-trap, or bell-trap.

76. The system of claim 73, wherein said intermediate conduit is configured to be used with and between said proximal conduit and said distal conduit.

77. The system of claim 59, wherein said liquid-carrying conduit may comprise a distal conduit.

78. The system of claim 59, wherein said heating device is configured to be:
- attachable to said liquid-carrying conduit;
- detachable from said liquid-carrying conduit; or
- attachable and detachable from said liquid-carrying conduit.

79. The system of claim 78, wherein thermal insulating layer is configured to be:
- attachable to at least one or both of said liquid-carrying conduit and said heating device;
- detachable from said at least one or both of said liquid-carrying conduit and said heating device; or
- attachable and detachable from said at least one or both of said liquid-carrying conduit and said heating device.

80. The system of claim 59, wherein said heating device is at least one or more of the following: induction heating device, radiant heating device, or convection heating device.

81. The system of claim 80, wherein said heating device is configured to be in direct contact with said liquid-carrying conduit at said thermal contact region.

82. The system of claim 59, wherein said heating device is an electrical resistance heat type device.

83. The system of claim 82, wherein said electrical resistance heat device is configured to be in direct contact with said liquid-carrying conduit at said thermal contact region.

84. The system of claim 82, wherein said electrical resistance heat device comprises any one or more of the following: heating wire, heating tape, thin-film heating element or polyimide film.

85. The system of claim 82, wherein said electrical resistance heating device is an extra low voltage device.

86. The system of claim 85, wherein said extra low voltage includes the range from about 10 volts to about 70 volts.

87. The system of claim 85, wherein said extra low voltage includes one of the following: about 12 volts, about 24 volts, or about 48 volts.

88. The system of claim 59, wherein said heating device is configured to be electrically connectable to a power supply.

89. The system of claim 59, wherein said heating device is configured to maintain the temperature of said lumen defined by said liquid-carrying conduit of said liquid-carrying conduit aligned with the thermal contact region at about 75 degree Celsius.

90. The system of claim 59, wherein said heating device is configured to maintain the temperature of said lumen defined by said liquid-carrying conduit of said liquid-carrying conduit aligned with the thermal contact region at one of the following temperatures:
- about 65 degree Celsius;
- about 70 degree Celsius;
- about 80 degree Celsius;
- about 85 degree Celsius;
- about 90 degree Celsius; or
- about 95 degree Celsius.

91. The system of claim 59, further comprising a temperature sensor device disposed at the thermal contact region for determining temperature of said liquid-carrying conduit at the thermal contact region.

92. The system of claim 91, further comprising a visual indicator device in electrical communication by a circuit with said temperature sensor device configured to produce a specified characteristic of light signal for one or more operational characteristics of the system.

93. The system of claim 92, wherein said operational characteristics include at least one of the following:
one or more specified temperatures at said thermal contact region;
specified status of a power supply, which is configured to be in electrical communication with said heating device; or
specified status of a thermal fuse or cutoff device, which is configured to be in electrical communication with said heating device.

94. The system of claim 92, wherein said visual indicator device is a light emitting diode (LED).

95. The system of claim 91, further comprising an audible indicator device in electrical communication by a circuit with said temperature sensor device configured to produce a specified characteristic of audio signal for one or more operational characteristics of the system.

96. The system of claim 95, wherein said operational characteristics include at least one of the following:
one or more specified temperatures at said thermal contact region;
specified status of a power supply, which is configured to be in electrical communication with said heating device; or
specified status of a thermal fuse or cutoff device, which is configured to be in electrical communication with said heating device.

97. The system of claim 95, wherein said audio indicator device is a speaker.

98. The system of claim 59, further comprising a thermal fuse, in electrical communication by a circuit with said heating device and disposed in contact with said thermal contact region of said intermediate conduit, wherein at a specified temperature that which said thermal fuse is subjected, said thermal fuse and circuit is configured to cut off energy supplied to said heating device.

99. The system of claim 98, wherein said circuit in electrical communication with said thermal fuse is configured to detect a fault in said thermal fuse.

100. The system of claim 59, further comprising one or more housings configured to enclose or retain said heating device.

101. The system of claim 100, wherein said one or more housings are configured to enclose or retain said thermal insulating layer.

102. The system of claim 101, wherein said one or more housing are configured to enclose or retain a temperature sensor device.

103. The system of claim 102, wherein said one or more housings are configured to enclose or retain said thermal insulating layer.

104. The system of claim 103, wherein said one or more housings are configured to enclose or retain at least one or more of the following: a thermal fuse, a visual indicator device, an audio indicator, a circuit, a cutoff fault circuit, a controller, control board, circuit board, and a processor.

105. The system of claim 60, wherein said bacterial growth and colonization comprises at least one or more of any combination of the following types of bacteria:
*Escherichia coli* (*E. coli*), *Enterobacter cloacae*, *Pantoea*, *Klebsiella pneumoniae*, and *Kluyvera*.

106. The system of claim 78, wherein said liquid-carrying conduit may comprise an intermediate conduit.

107. The system of claim 91, wherein said liquid-carrying conduit may comprise a proximal conduit.

108. The system of claim 107, wherein said heating device is configured to maintain the temperature of said proximal conduit at one or more of the following temperatures or ranges of temperatures in degree Celsius:
about 40;
about 47;
about 50;
about 54;
about 40-49; or
about 50-59.

109. The system of claim 91, wherein said liquid-carrying conduit may comprise a distal conduit.

110. The system of claim 81, wherein said liquid-carrying conduit may comprise an intermediate conduit.

111. The system of claim 89, wherein said liquid-carrying conduit may comprise an intermediate conduit.

112. The system of claim 90, wherein said liquid-carrying conduit may comprise an intermediate conduit.

113. The system of claim 91, wherein said liquid-carrying conduit may comprise an intermediate conduit.

114. The system of claim 60, wherein said liquid-carrying conduit may comprise a proximal conduit.

115. The system of claim 60, wherein said liquid-carrying conduit may comprise a distal conduit.

116. The system of claim 59, wherein said thermally conductive material or non-heat-resistant material includes at least one or more of the following materials: brass, silver, copper, aluminum, stainless steel, or gold.

* * * * *